(12) United States Patent
Villain

(10) Patent No.: US 8,829,378 B2
(45) Date of Patent: Sep. 9, 2014

(54) CONTROL DEVICE COMPRISING A MOVEABLE UPPER PANEL AND ARMS FOR ACTUATING A SWITCH

(75) Inventor: Jean-Christophe Villain, Dole (FR)

(73) Assignee: CoActive Technologies, LLC, Newton, MA (US)

( * ) Notice: Subject to any disclaimer, the term of this patent is extended or adjusted under 35 U.S.C. 154(b) by 226 days.

(21) Appl. No.: 13/381,739

(22) PCT Filed: Jul. 1, 2010

(86) PCT No.: PCT/EP2010/059359
§ 371 (c)(1),
(2), (4) Date: Dec. 30, 2011

(87) PCT Pub. No.: WO2011/000910
PCT Pub. Date: Jan. 6, 2011

(65) Prior Publication Data
US 2012/0103773 A1    May 3, 2012

(30) Foreign Application Priority Data
Jul. 1, 2009 (FR) .................................. 09 54492

(51) Int. Cl.
*H01H 13/702* (2006.01)
*G06F 3/041* (2006.01)
*G06F 3/0354* (2013.01)
*H01H 3/12* (2006.01)
*H01H 3/16* (2006.01)

(52) U.S. Cl.
CPC ............ *G06F 3/03547* (2013.01); *H01H 3/125* (2013.01); *H01H 3/16* (2013.01); *G06F 3/041* (2013.01)
USPC ............................ 200/512; 200/5 R; 345/173

(58) Field of Classification Search
CPC ........................... H01H 25/041; H01H 13/702
USPC ......................... 200/332, 335, 512, 514, 515
See application file for complete search history.

(56) References Cited

U.S. PATENT DOCUMENTS

2009/0135145 A1* 5/2009 Chen et al. ................... 345/173

* cited by examiner

*Primary Examiner* — Renee Luebke
*Assistant Examiner* — Ahmed Saeed
(74) *Attorney, Agent, or Firm* — Fox Rothschild LLP

(57) ABSTRACT

A device for controlling an electronic apparatus, comprising: a generally flat upper panel; a lower armature of a support with respect to which armature the upper panel can move in a generally vertically downward movement; a switch; and at least two arms for actuating the switch, each arm comprising a first end which bears on the upper panel, a second end which bears on the switch, and an intermediate portion which bears on the armature, in which the arms cooperate with the upper panel and the armature in order to keep the upper panel parallel to a horizontal plane during its vertical movement with respect to the armature.

20 Claims, 23 Drawing Sheets

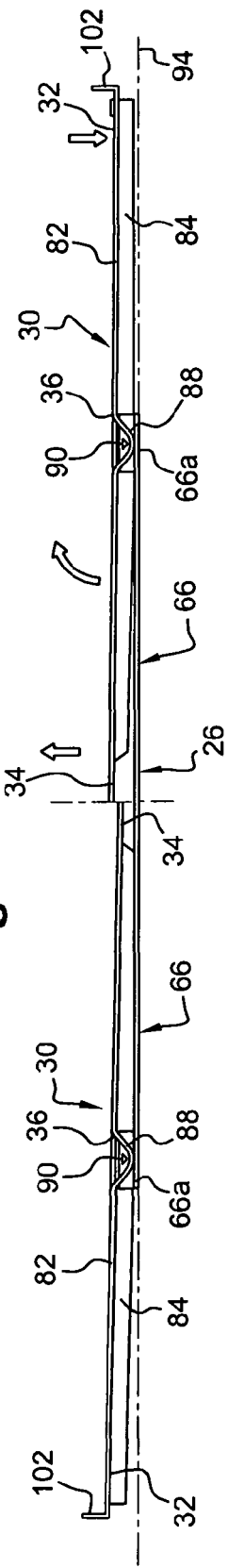
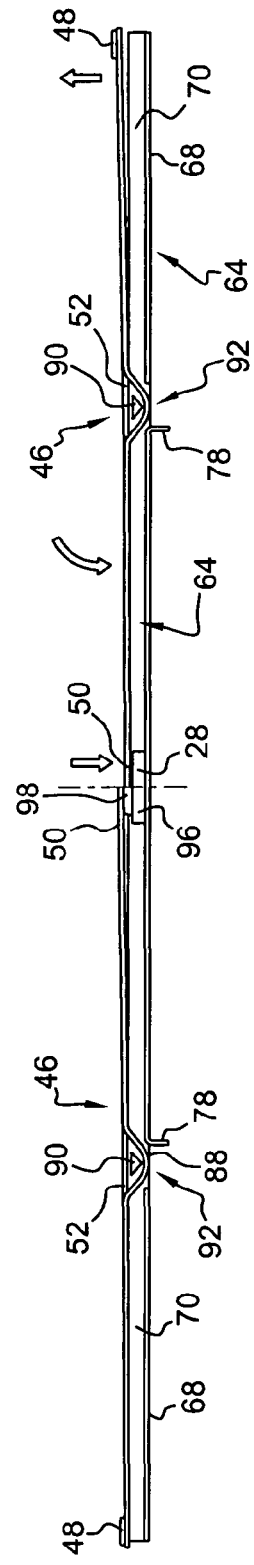

CONTROL DEVICE COMPRISING A MOVEABLE UPPER PANEL AND ARMS FOR ACTUATING A SWITCH

RELATED APPLICATION AND CLAIM OF PRIORITY

This application claims the priority benefit of International Application Number PCT/EP2010/059359, filed Jul. 1, 2010, the contents of which is hereby incorporated by reference in its entirety.

BACKGROUND

The present disclosure provides a device for controlling an electronic apparatus, comprising a moveable upper panel on which at least one control action is exerted. More particularly, the disclosure provides a device for controlling an electronic apparatus, comprising a generally flat and horizontal upper panel on an upper face of which a control member is capable of exerting a control action, consisting of a compressive force oriented generally downwards, a lower armature of a support with respect to which armature the upper panel can move in a generally vertically downward movement under the effect of the control action, a switch which is carried by the armature and which can be actuated under the effect of the control action in order to produce a signal for controlling the electronic apparatus, and at least two arms for actuating the switch.

The control device is designed in such a way that, under the effect of the control action, the upper panel moves downwards in a movement consisting generally of a vertical translation and so as to actuate the switch via the actuating arms.

The actuating arms cooperate with the upper panel and with the lower armature in order to keep the upper panel substantially parallel to its horizontal plane when the control action is exerted.

Document WO-A1-2008/152457 describes and represents a control device for which the actuating arms are articulated to the upper panel and to the armature.

The switch is actuated by a single actuating arm under the effect of the control action, thereby making the system unbalanced depending on whether the control action is exerted on the upper panel at a point positioned close to the position of the switch or at a point away from said switch.

In addition, each arm is linked to the upper panel, to the lower armature or to the other arms via articulations for which a certain operating play is necessary in order to allow relative movement of the components.

These operating plays induce that the components of the device move with respect to one another, this having the consequence that the upper panel is not correctly maintained in a horizontal orientation. Another consequence of these relative movements is that the resultant force of the control action is not transmitted uniformly to the switch.

Document EP-A1-0.419.145 describes a control device for which each actuating arm is bearing on the upper panel, against the armature or against the other arm.

This reference makes it possible to avoid the problems resulting from the operating plays mentioned here above.

However, according to this reference, each arm is connected to the upper panel at a point which is positioned horizontally in a position which is intermediate between the centre of the upper panel and the peripheral edge of the upper panel.

Thus, when the point of application of the control action on the upper panel is positioned close to the peripheral edge of the upper panel, the upper panel then tilts about an actuating arm.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

The object of the present disclosure is to provide a device for controlling an electronic apparatus permitting the upper panel to be kept parallel to its horizontal plane, irrespective of the position of the point of application of the control action.

For this purpose, the present disclosure provides a device for controlling an electronic apparatus, comprising a generally flat and horizontal upper panel on an upper face of which a control member is capable of exerting a control action, consisting of a compressive force oriented generally downwards, a lower armature of a support with respect to which armature the upper panel can move in a generally vertically downward movement under the effect of the control action, a switch which is carried by the armature and which can be actuated under the effect of the control action in order to produce a signal for controlling the electronic apparatus, and at least two arms for actuating the switch, each arm comprising a first end which bears vertically upwards on a lower face of the upper panel, a second end which bears on, or presses against, the switch, and an intermediate portion which bears vertically downwards on an upper face of the armature and around which portion each arm can pivot about a horizontal geometric pivot axis, in which the arms cooperate with the upper panel and the armature in order to keep the upper panel parallel to a horizontal plane during its vertical movement with respect to the armature.

The present disclosure also provides a device for controlling an electronic apparatus, comprising a generally flat and horizontal upper panel on an upper face of which a control member is capable of exerting a control action, consisting of a compressive force oriented generally downwards, a lower armature of a support with respect to which armature the upper panel can move in a generally vertically downward movement under the effect of the control action, a switch which is carried by the upper panel and can be actuated under the effect of the control action in order to produce a signal for controlling the electronic apparatus, and at least two arms for actuating the switch, each arm comprising a first end which bears vertically downwards on an upper face of the armature, a second end which bears on the switch, and an intermediate portion which bears vertically upwards on a lower face of the upper panel and around which intermediate portion each arm can pivot about a horizontal geometric pivot axis, in which device the arms cooperate with the upper panel and the armature in order to keep the upper panel parallel to a horizontal plane during its vertical movement with respect to the armature.

According to other features of the present disclosure, taken individually or in combination: the switch is interposed vertically between the second end of each arm and at least one support which is stationary with respect to the armature; the arms bear on the switch via at least one lever articulated to a support about a horizontal axis, said support being stationary with respect to the armature; the switch is interposed vertically between the second end of each arm and at least one support which is stationary with respect to the upper panel; the arms bear on the switch via at least one lever articulated to a support about a horizontal axis, said support being stationary with respect to the upper panel; said lever has a first end on which the second end of each arm bears and a second end which bears directly on the switch; the switch is compressed vertically between the armature and a second end of said at least one lever; the switch is compressed vertically between the upper panel and a second end of said at least one lever; the first end of each arm is positioned horizontally in line with a peripheral edge of the upper panel; the switch is positioned horizontally, generally in line with the centre of the upper panel; the device has two arms placed horizontally and generally symmetrically with respect to the switch; the device has two pairs of arms and two levers, each lever being associated with a pair of arms, in such a way that the second end of the arms of one pair of arms bears on a first end of the lever associated with said pair of arms and in such a way that the second end of each lever acts on the switch; and the dimensional ratio of each arm, of a first distance, between the first end of the arm and the intermediate portion of the arm, by a second distance, between the intermediate portion of the arm and the second end of the arm, is identical for all the arms.

BRIEF DESCRIPTION OF THE DRAWINGS

Other features and advantages of the invention will become apparent on reading the following detailed description, to understand which reference will be made to the appended figures in which:

FIG. 6 illustrates two half-views of the control device according to the invention, showing the movement of the arms during the actuation of the control device according to the invention;

FIG. 7 illustrates two half-views of the control device according to the invention, showing the movement of the levers during the actuation of the control device according to the invention;

DETAILED DESCRIPTION

Figure 1:
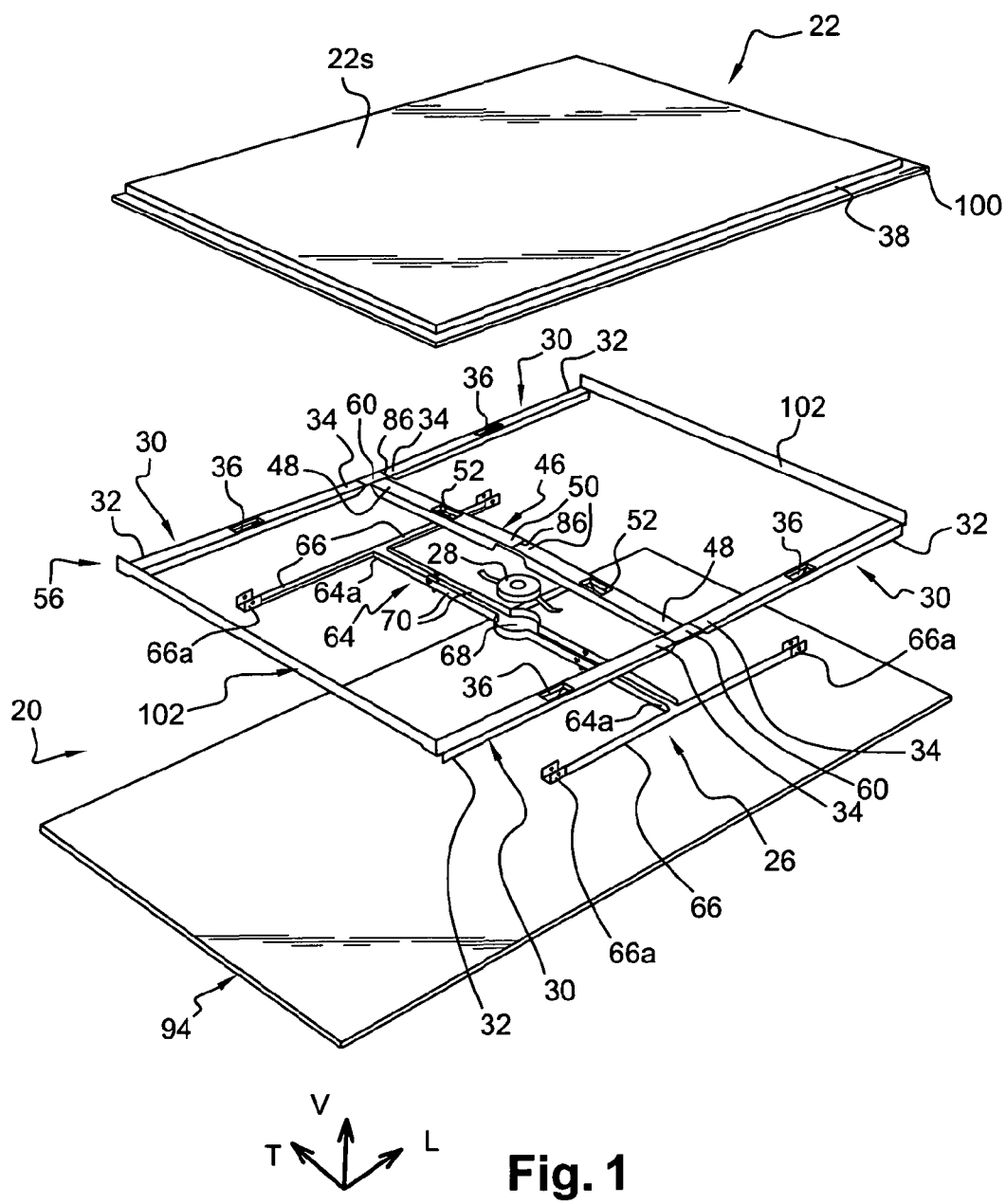
FIG. 1 illustrates a schematic representation, in exploded perspective, of a control device according to the invention.

The reference trihedron V, L, T (vertical, longitudinal and transverse orientations) indicated in the figures will be adopted without being limited thereto and without any restrictive reference to the Earth's gravity.

In the following description, identical, similar or analogous elements will be designated by the same numeral references.

It has been illustrated in the figures a device 20 for controlling an electronic apparatus, such as for example a computer, a PDA (Personal Digital Assistant) or a "smart phone", which combines the features of a PDA with those of a digital telephone.

The control device 20 comprises an upper panel 22 on which a user acts in order to control the electronic apparatus.

The upper panel 22 consists of a flat element, which here is horizontal and of rectangular shape, the long sides of which are parallel to the longitudinal direction "L".

The operation of actuating the control device 20 consists in exerting an action, hereafter called the "control action", on the upper face 22s of the upper panel 22 via a pointing element 24. This pointing element 24 is for example a stylus or a finger of the user. The control action consists of a compressive force mainly oriented vertically downwards, which is exerted by the pointing element at a point of contact "P" between one end of the pointing element 24 and the upper face 22s of the upper panel 22.

According to one embodiment, the upper panel 22 consists only of a plate, for example made of a rigid plastic.

According to another embodiment, the upper panel 22 includes means for locating the geometrical position of the contact point "P" on the upper face 22s of the upper panel 22. The control device 20 is then of the "touch pad" type, used for example for a portable computer. The upper panel 22 is then a component usually called a "touch pad".

According to yet another embodiment, the upper panel 22 includes, in addition to the locating means, information display means, for example a display screen, in order to permit the user to see information relating to the electronic apparatus, and/or information associated with the manipulations that the user performs on the upper panel 22. The upper panel 22 is then a component usually called a "touch screen".

The control device 20 is intended to be mounted in the electronic apparatus in a manner such that the upper face 22s of the upper panel 22 is flush with a covering element or casing of the electronic apparatus.

Each edge 38 of the upper panel 22 has a peripheral rim 100 which is positioned vertically set back with respect to the upper face 22s of the upper panel 22 and is intended to be held beneath the covering element.

Thus, the rim 100 of the upper panel 22 cooperates with the covering element so that the upper panel 22 butts against the covering element in a high, rest position and for positioning the upper panel 22 horizontally and transversely with respect to the covering element.

The control device 20 also includes a lower armature 26 by means of which the control device 20 is assembled inside the electronic apparatus.

Figure 8A:
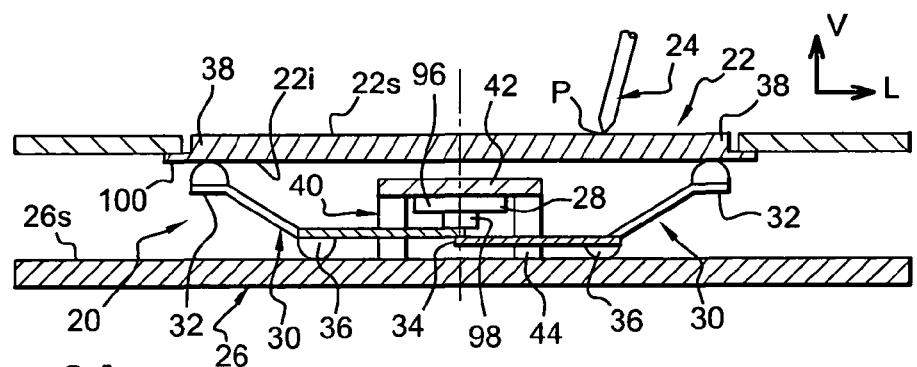
FIGS. 8A and 8B illustrate schematic sectional representations along a vertical longitudinal plane (FIG. 8A) and in a top view (FIG. 8B) of a first embodiment of the invention, in which FIGS. 8A and 8B the control device comprises only two actuating arms and in which the switch is carried by the support armature.

The armature 26 is shown in FIG. 8A et seq. in the form of a flat plate and consists for example of a so-called "component-carrying" support plate on which electronic components and electronic circuits are placed.

According to another embodiment shown in FIGS. 1 to 7, the armature 26 consists of a frame or framework made of sheet metal, which permits the control device 20 to be mounted and assembled on a support component of the electronic apparatus, for example on a component-carrying support plate.

The upper panel 22 is mounted so as to move with respect to the armature 26 in a vertically downward movement when a control action is exerted on the upper face 22s of the upper panel 22.

When the control action is released, the upper panel 22 moves in the opposite direction, i.e. it undergoes a vertically upward movement with respect to the armature 26.

The control device 20 includes a switch 28, or switching interrupter 28, that can be actuated when the upper panel 22 moves downwards under the effect of the control action, generating, as a result, a signal for controlling the electronic apparatus.

The switch 28 may be of any known type.

The compressive force exerted on the upper panel 22 is transmitted to the switch 28 in order for the switch 28 to be actuated under the effect of the control action. According to one embodiment, the switch 28 is capable of generating the control signal when it is submitted to a compressive force greater than a predetermined value.

Thus, the switch 28 makes it possible to detect any control action consisting in exerting a pressure, greater than the predetermined threshold value, on the upper face 22s of the upper panel 22.

According to another embodiment, when the pressure of the control action is below said threshold value, the switch 28 constitutes an abutment, or stop, for the upper panel 22 at a certain vertical (height) position with respect to the armature 26, preventing the upper panel 22 from moving downwards with respect to the armature. In this position, the switch 28 is not actuated, and therefore the control signal is not generated.

The switch 28 is able to change state when the pressure of the control action exceeds said threshold value.

Following this change of state, the switch 28 therefore no longer forms an abutment for the upper panel 22, thus enabling the upper panel 22 to move downwards as far as a position called a position for actuating the switch 28.

The control signal is then generated when the switch 28 changes state.

A tactile sensation is also perceived by the user, via the pointing element 24, when the switch 28 changes state, especially since the user feels a rapid change in the resistance to the movement of the upper panel 22, in the manner of a "click" of a pushbutton.

The user is thus informed by touch that the control action has been exerted on the control device 20.

The control device 20 also has arms 30 for actuating the switch 28, which are positioned vertically globally between a horizontal lower face 22i of the upper panel 22 and, opposite, an upper face 26s of the armature 26.

One end of each arm bears on the switch 28 and each arm cooperates with the upper panel 22 and with the armature 26 in order to actuate the switch 28 when a control action is exerted on the upper face 22s of the upper panel 22.

In addition, the actuating arms 30 cooperate with the upper panel 22 and with the armature 26 in order to keep the upper panel 22 parallel to a horizontal plane, when the upper panel 22 moves vertically with respect to the armature 26.

FIGS. 8A to 15B show a first example of the control device in which the switch 28 is carried by the armature 26.

Moreover, in this example, each arm has a first end 32 which bears vertically upwards on the lower face 22i of the upper panel 22, a second end 34 which bears on the switch 28, and an intermediate portion 36 which bears vertically downwards against the upper face 26s of the armature 26.

Each arm 30 also has straight portions connecting the intermediate portion 36 to the first end 32 and to the second end 34. These straight portions are relatively rigid so as to deform to a limited extent when the control device 20 is actuated.

The first ends 32 of the arms 30 are positioned with respect to the upper panel 22 so that they are positioned respectively at the vertices of a polygon, each of which corresponds to a point where the first end 32 of an arm 30 bears on the lower face 22i of the upper panel 22. Preferably, the first end 32 of each arm 30 is positioned horizontally proximal to the peripheral edge 38 of the upper panel 22, so that the area of the polygon is as large as possible.

The intermediate portion 36 of each arm 30 bears on the upper face 26s of the armature 26 in such a way that the arm 30 can pivot with respect to the armature 26 about a horizontal pivot axis A, located in this intermediate portion 36.

Thus, during the downward movement of the upper panel 22, the first end 32 of each arm 30 moves downwards and the second end 34 of each arm 30 moves upwards.

Figure 8B:
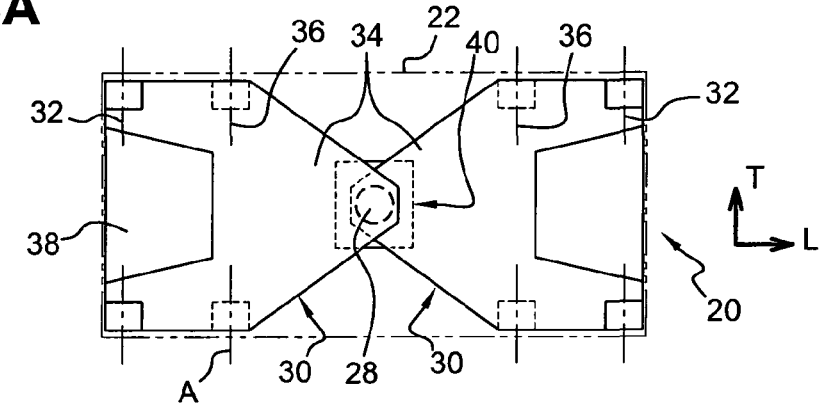

FIGS. 8A and 8B show a first embodiment of this example, in which the control device 20 has two arms 30 placed between the upper panel 22 and the armature 26 for actuating the switch 28.

According to this embodiment, the switch 28 is actuated directly by the second end 34 of each arm 30.

Here, the switch 28 is positioned horizontally globally at the centre of the upper panel 22. The two arms 30 are placed horizontally, on each side of the switch 28, that is to say they are here positioned horizontally, symmetrically with respect to the switch 28.

Here, each arm 30 consists of a plate, for example made of sheet metal, which has been cut, bent and stamped so as to define bearing and pivoting points at the first end 32, at the second end 34 and at the intermediate portion 36.

The first end 32 of each arm 30 is positioned proximal to a longitudinal edge 38 of the upper panel 22.

Here, the first end 32 of each arm 30 bears on the lower face 22i of the upper panel 22 at two points positioned at the corners of the upper panel 22. These two bearing points are also aligned transversely.

The intermediate portion 36 of each arm 30 is positioned longitudinally at a distance intermediate between the first end 32 and the second end 34 of the arm 30.

Here, the intermediate portion 36 bears on the upper face 26s of the armature 26 at two points which are aligned transversely and which define the geometric pivot axis of the arm 30. Thus, this axis is here parallel to the transverse orientation "T".

The second end 34 of each arm is positioned horizontally in line with the switch 28, that is to say at the centre of the upper panel 22.

As mentioned above, when a control action is exerted on the upper panel 22, the arms 30 pivot in such a way that each second end 34 moves upwards and the arms 30 therefore generate an upwardly directed pressure.

To allow the switch 28 to be actuated by this upwardly directed pressure of the second end 34 of each arm 30, the switch 28 is placed above the second ends 34 of the arms 30 and is interposed vertically between the second end 34 of each arm 30 and a support 40 on which the switch 28 is mounted and which is fixedly carried by the armature 26.

The support 40 comprises a horizontal support plate 42 which is placed vertically above and at a certain vertical distance from the upper face 26s of the armature 26. The support 40 also has an upright 44 connecting the support plate 42 to the armature 26.

The switch 28 is mounted on a lower face 42i of the support plate 42 and is compressed vertically between the support plate 42 and the second end 34 of each arm 30.

Figure 9A:
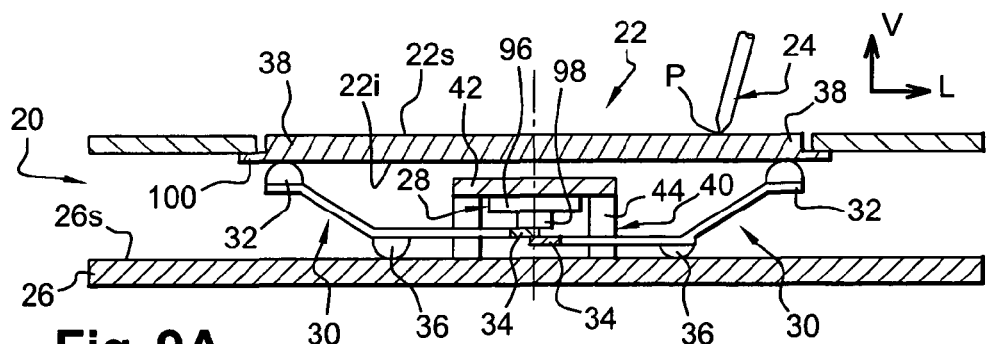
FIGS. 9A and 9B illustrate views similar to those of FIGS. 8A and 8B, in which the control device comprises four actuating arms.
Figure 9B:
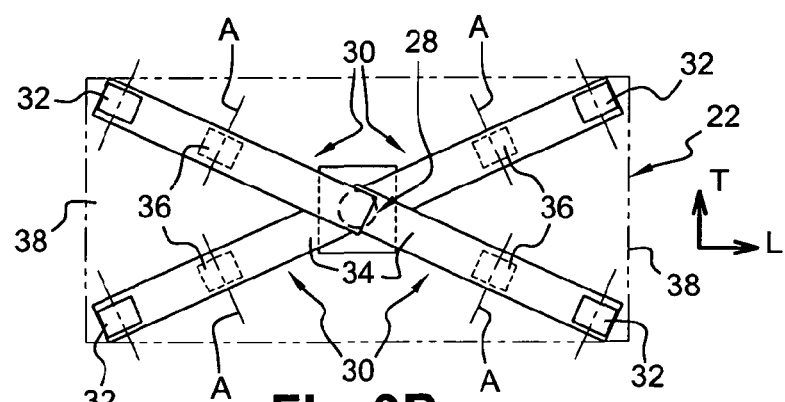

FIGS. 9A and 9B show a variant of the control device, in which the actuating arms 30 are four in number.

Each arm 30 consists of a bar that has been bent so that the first end 32 of the arm 30 bears on the lower face 22i of the upper panel 22 at a single point, and in such a way that the intermediate portion 36 of the arm 30 bears on the upper face 26s of the armature 26 at a single point.

The switch 28 here is also positioned at the centre of the upper panel 22. The arms 30 are distributed around the switch 28 in such a way that the first end 32 of each arm 30 is positioned at a corner of the upper panel 22.

Each arm 30 is oriented radially about a vertical axis centred on the switch 28. The switch 28 is mounted so as to be vertically compressed between the support plate 42 of the support 40 and the second end 34 of each arm 30.

When a control action is exerted on the upper panel, each arm 30 pivots with respect to the armature 36 about a horizontal pivot axis A positioned in the intermediate portion 36 of the arm 30. This pivot axis is orthogonal to the radial orientation of the arm 30.

This variant of the control device 20 enables each arm 30 to be subjected to stresses that lie in a radial plane with respect to the vertical axis centred on the switch 28. Thus, the arm is not subjected to any torsional stress.

Figure 10A:
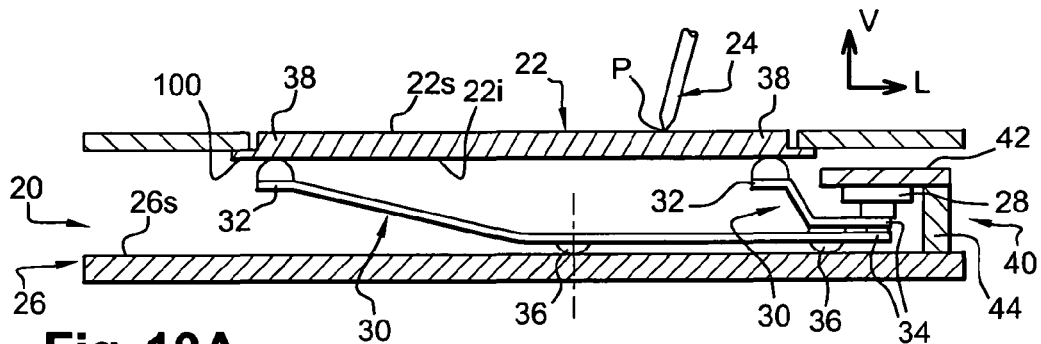
FIGS. 10A and 10B illustrate views similar to those of FIGS. 8A and 8B, in which the control device comprises four actuating arms and in which the switch is offset longitudinally.
Figure 10B:
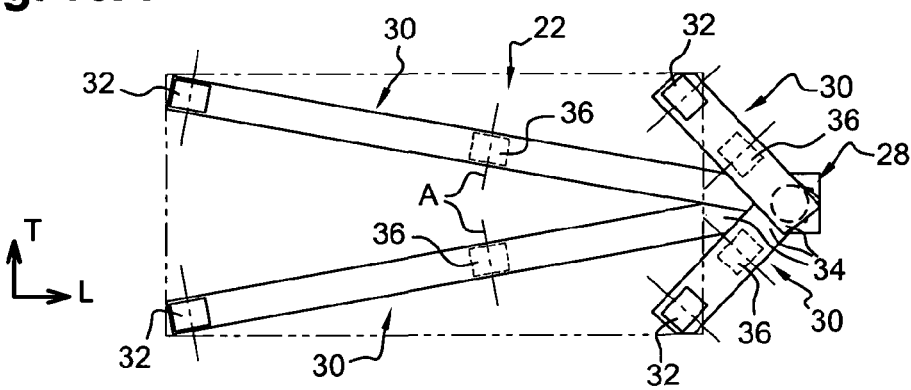

FIGS. 10A and 10B show another variant of the control device, in which the actuating arms 30 are four in number, as described above, and in which the switch 28 is offset horizontally with respect to the upper panel.

According to this variant, each arm 30 consists of a bar extending in a radial plane with respect to a vertical axis centred on the switch 28, and the first end 32 of each arm 30 is positioned at a corner of the upper panel.

In this variant, the switch 28 and the support 40 are therefore not positioned beneath the upper panel. Thus, they cannot interfere with the upper panel 22 during its downward vertical movement.

It is then possible to produce a control device for which the distance between the upper panel 22 and the armature 26 is smaller than in the variants illustrated here above, for which the switch is positioned beneath the upper panel 22.

Figure 11A:
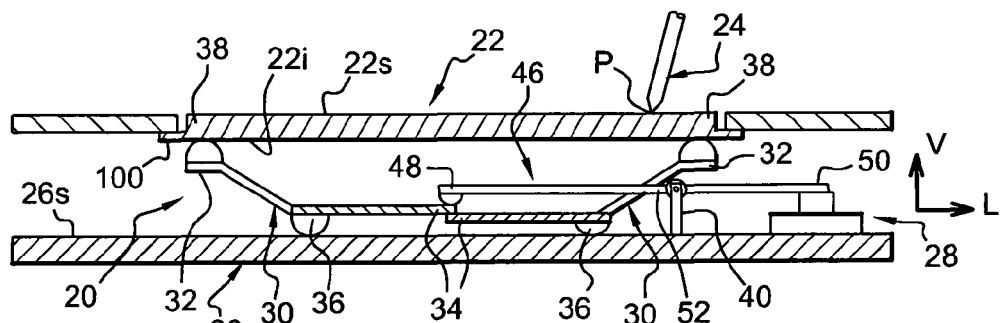
FIGS. 11A and 11B illustrate views similar to those of FIGS. 8A and 8B, in which the control device comprises two actuating arms and one lever articulated with respect to the armature.
Figure 11B:
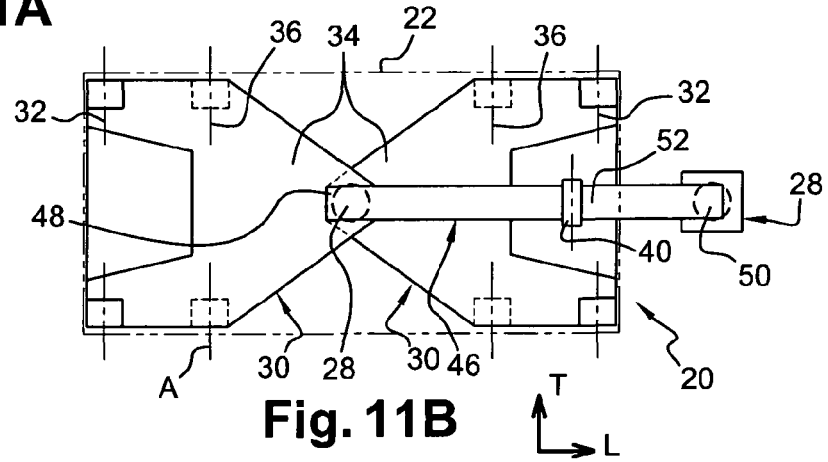

FIGS. 11A and 11B show another variant of the control device, in which the actuating arms 30 are two in number and in which the switch 28 is mounted directly on the upper face 26s of the armature 26.

By mounting the switch 28 directly on the armature 26, it is easier to mount and to electrically connect the switch 28, especially when the armature 26 consists of a support plate carrying electronic components.

The switch 28 is then actuated when it is subjected to a downwardly directed force.

However, as indicated above, when a control action is exerted on the upper panel 22, the second end 34 of each arm 30 moves upwards with respect to the armature 26.

According to this variant, the switch 28 is actuated by means of one lever 46 which is articulated to a support 40 about a horizontal axis.

The support 40 is fixed to the upper face 26s of the armature 26.

Here, the lever 46 has a first end 48 on which the second end 34 of each arm 30 bears on. A second end 50 of the lever 46 bears downwards on the switch 28, and an intermediate portion 52 of the lever 46 is articulated with respect to the support 40.

Thus, the lever 46 permits the upward pressure of the second end 34 of each arm 30 to be converted into a downwardly oriented force on the switch 28.

The first end 48 of the lever 46 is positioned horizontally in line with the centre of the upper panel 22.

The switch 28 and the second end 50 of the lever 46 are offset longitudinally with respect to the upper panel 22.

Consequently, the lever 46 has a mainly longitudinal orientation.

Figure 12A:
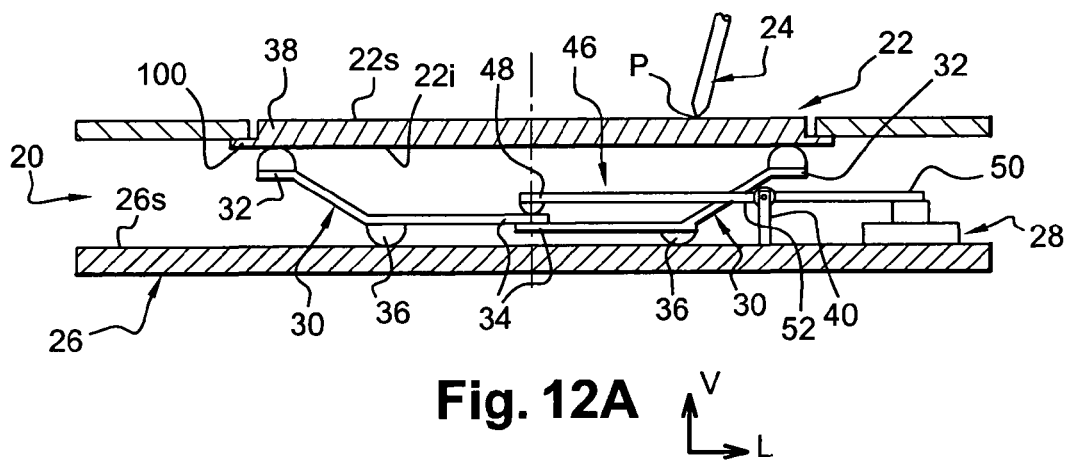
FIGS. 12A and 12B illustrate views similar to those of FIGS. 9A and 9B, in which the control device comprises four actuating arms and one lever articulated with respect to the armature.
Figure 12B:
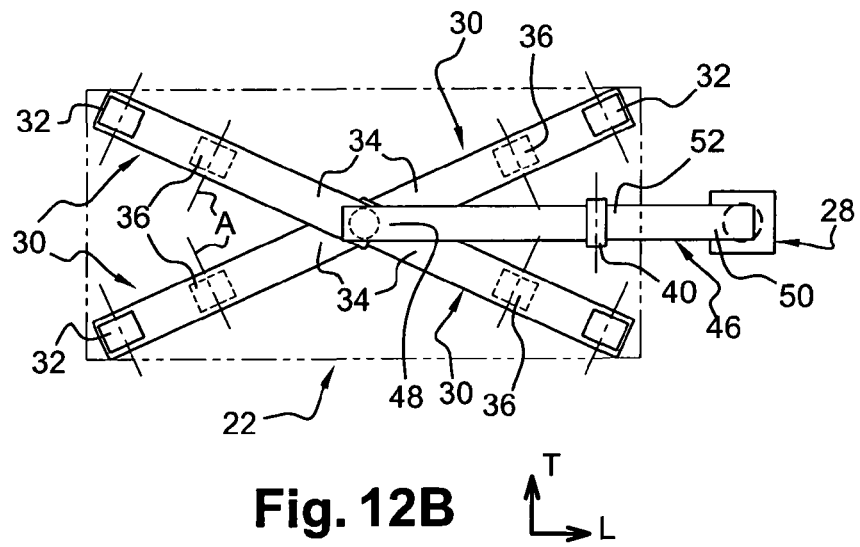

FIGS. 12A and 12B show another variant of the control device, in which the actuating arms 30 are four in number, similarly to the variant shown in FIGS. 9A and 9B, and in which the switch 28 is mounted directly on the upper face 26s of the armature 26.

As in the variant described above, the switch 28 is actuated by means of one lever 46 which is articulated with respect to a support 40 about a horizontal axis. The support 40 is fixed to the upper face 26s of the armature 26.

Figure 13A:
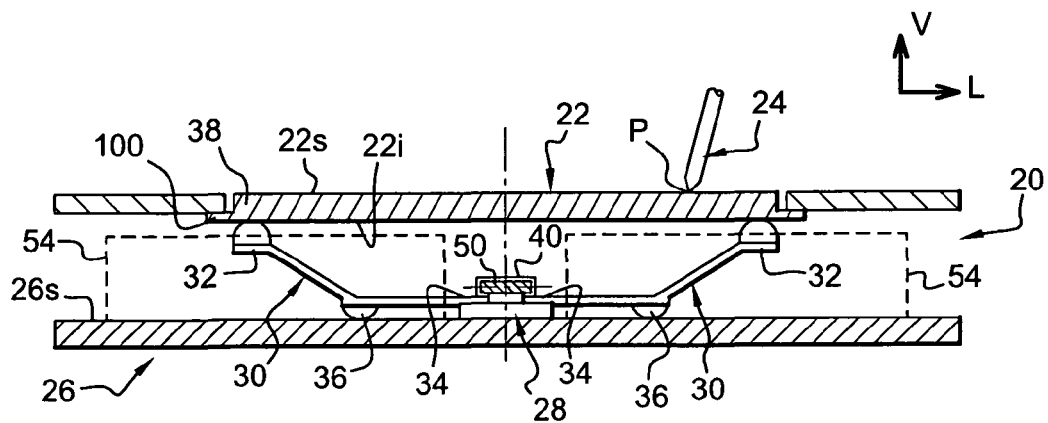
FIGS. 13A and 13B illustrate views similar to those of FIGS. 12A and 12B.
Figure 13B:
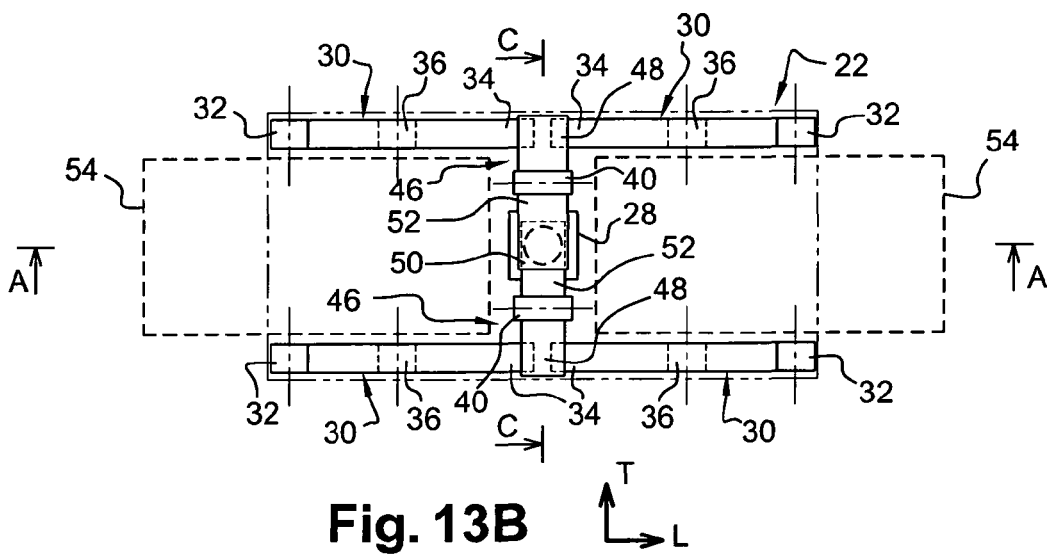
Figure 13C:
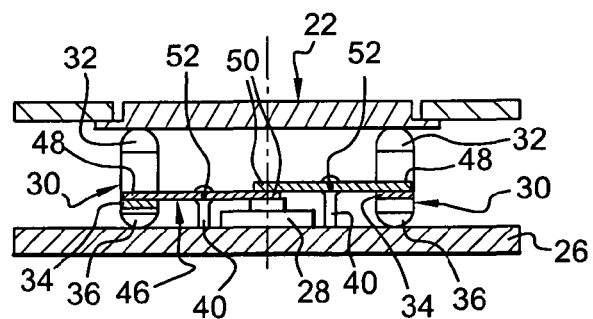
FIG. 13C is a sectional view, along a transverse vertical plane, of the control device, in which FIGS. 13A and 13B the control device comprises four actuating arms and two levers articulated with respect to the armature.

FIGS. 13A to 13C show another variant of the control device, in which the actuating arms 30 are four in number and in which the switch 28 is mounted directly on the upper face 26s of the armature 26. The switch 28 is actuated by means of two levers 46.

The arms 30 are grouped in pairs, that is to say the control device 20 comprises two pairs of two arms 30.

The arms 30 of one pair of arms 30 are placed along a longitudinal edge of the upper panel 22, i.e. here along one long lateral edge. The main orientation of the arms 30 is therefore longitudinal.

The second end 34 of each of the two arms 30 of a pair of arms 30 is positioned in the middle of said longitudinal edge of the upper panel 22.

Each pair of arms 30 is associated with one lever 46 which is mounted so as to be articulated with respect to a support 40 which is itself fixed to the armature 26.

The first end 48 of the lever 46, on which the second ends 34 of the arms 30 of the pair of arms 30 bear, is positioned in line with the middle of said longitudinal edge of the upper panel 22.

The second end 50 of the lever 46 is positioned proximal to the switch 28, that is to say, here, in line with the centre of the upper panel 22, and the second end bears directly on the switch.

The lever 46 is thus oriented mainly perpendicular to the arms 30 of the associated pair of arms 30, that is to say the lever is oriented here in the transverse direction "T".

According to this variant, the pairs of arms 30 and the levers 46 are placed generally symmetrically with respect to a vertical longitudinal mid-plane of the control device 20.

In this variant, the arms 30, the levers 46, the upper panel 22 and the armature 26 define two zones 54 which receive no component of the control device.

These "free" zones 54 are capable of receiving components independent of the control device 20, such as for example electrical or electronic components that are carried by the armature 26 or that are carried by a component-carrying support plate on which the armature 26 is mounted.

The free zones may also receive components that are carried by the upper panel 22, for example a flexible strip (not shown) for connecting the upper panel 22 to an electronic control circuit. The flexible strip may then be formed freely in a free zone, without coming into contact with another component.

Figure 14A:
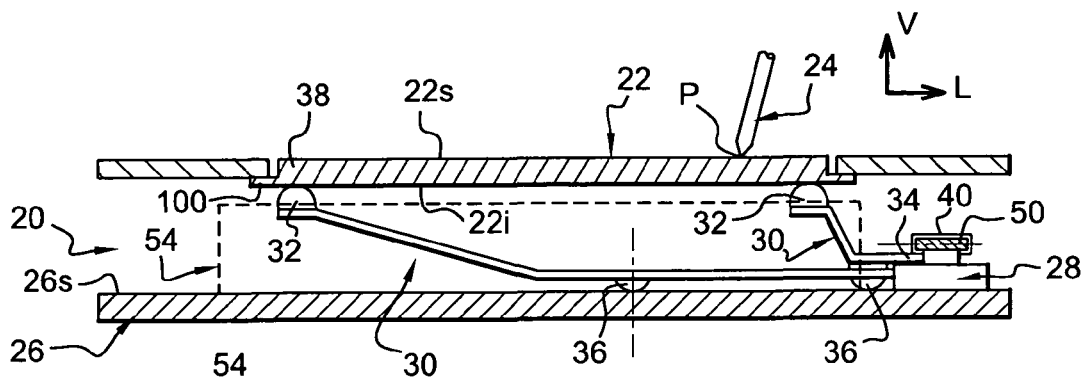
FIGS. 14A to 14C illustrate views similar to those of FIGS. 13A to 13C, in which the switch is offset longitudinally with respect to the upper panel.
Figure 14B:
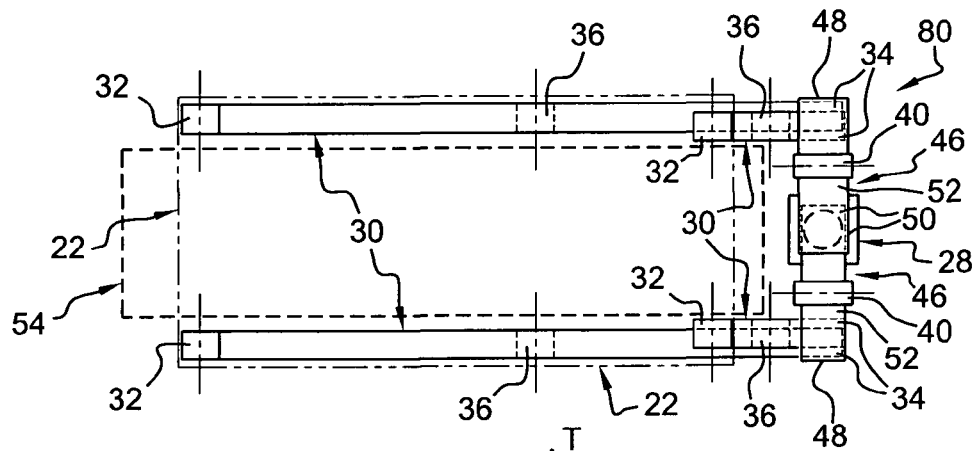
Figure 14C:
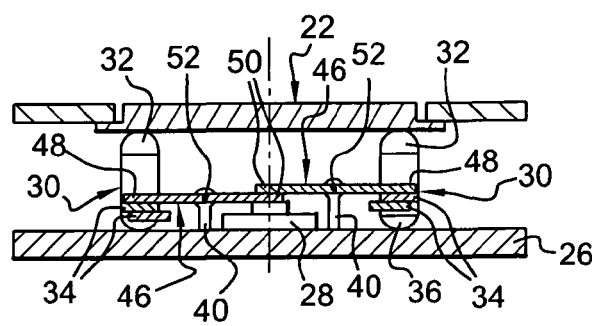

FIGS. 14A to 14C show another variant of the control device, in which the actuating arms 30 are four in number, grouped in two pairs, and in which the switch 28 is mounted directly on the upper face 26s of the armature 26. The switch is offset horizontally with respect to the upper panel 22.

In this variant, the arms 30 have a longitudinal main orientation and each pair of arms 30 is associated with a lever 46 of transverse main orientation which is articulated with respect to a support 40 fixed to the armature 26.

The second end 34 of each arm 30 is positioned longitudinally with respect to the switch.

The levers 46 are offset longitudinally with respect to the upper panel 22, like the switch 28.

Thus, in this variant, a single free zone 54 is delimited by the components of the control device 20 and it extends longitudinally over the entire length of the upper panel 22.

Figure 15A:
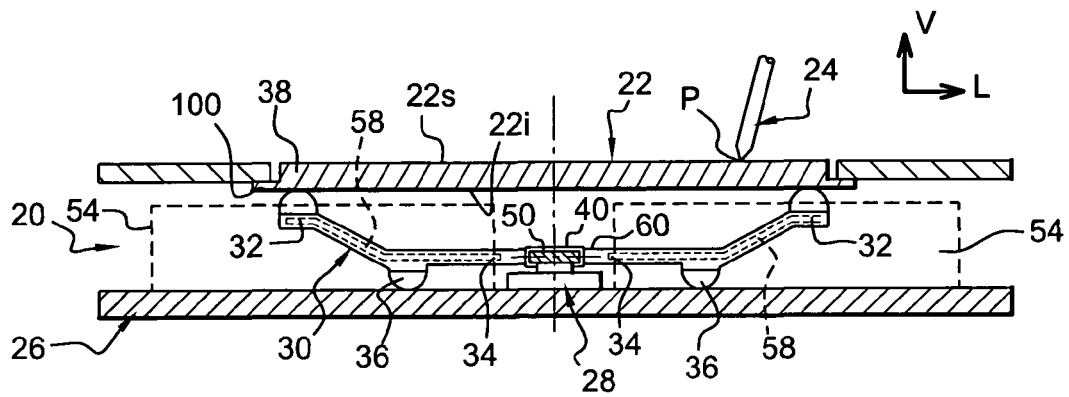
FIGS. 15A to 15C illustrate views similar to those of FIGS. 13A to 13C, in which the actuating arms and the levers are made in a single piece.
Figure 15B:
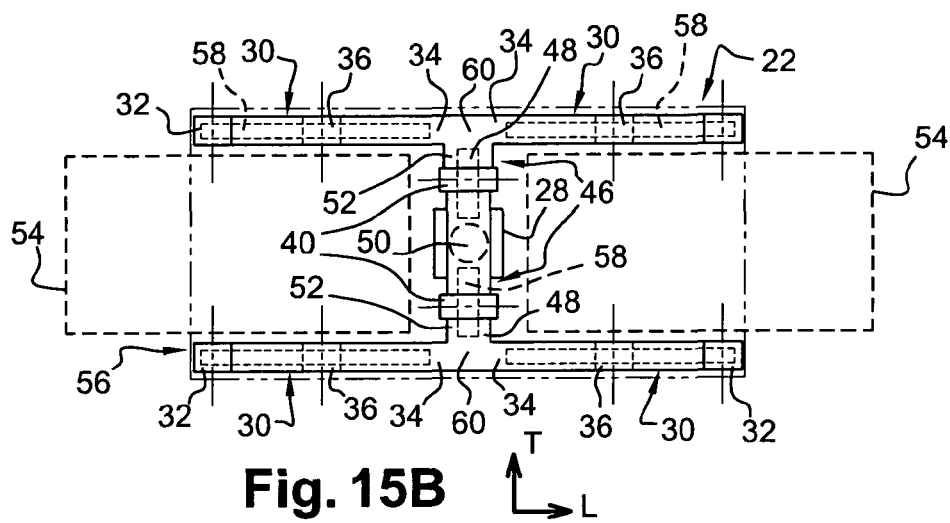
Figure 15C:
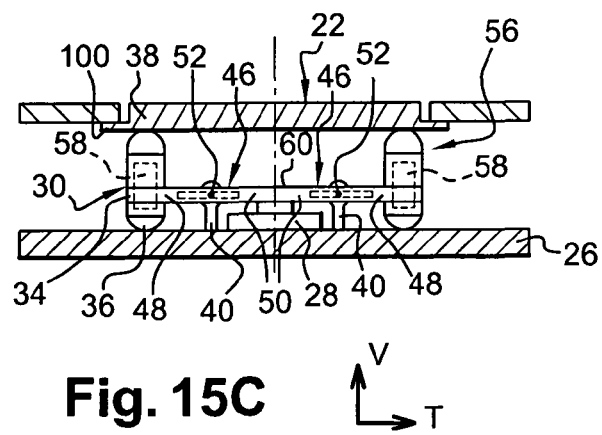

FIGS. 15A to 15C show another variant of the control device similar to that of FIGS. 13A to 13C, in which the actuating arms 30 are four in number, grouped in pairs, and in which each pair of arms 30 is associated with a lever 46.

In this variant, the switch 28 is mounted directly on the upper face 26s of the armature 26 and is positioned in line with the centre of the upper panel 22.

In this variant of the control device, the four arms 30 and the two levers 46 are made as a single piece, for example by cutting, bending and/or stamping a sheet metal plate 56.

This single piece 56 has straight sections 58 constituting the arms 30 or the levers 46.

The single piece 56 also has portions 60 which are produced so as to be elastically deformable and which connect and articulate the arms 30, and which connect the levers 46 together, in order to permit their relative movements.

By making the arms 30 and the levers 46 as a single piece 56, it is possible to simplify the construction and the assembly of the control device by reducing the number of components, and thereby lowering the assembly costs of the control device 20.

FIGS. 16A to 21C show a second example of the control device 20 in which the switch 28 is carried by the upper panel 22.

According to this second example, each arm has a first end 32 which bears vertically downwards on the upper face 26s of the armature 26, a second end 34 which bears on the switch 28, and an intermediate portion 36 which bears vertically on the lower face 22i of the upper panel 22.

The first end 32 of each arm 30 is positioned horizontally in line with the peripheral edge 38 of the upper panel 22 in order for the first ends 32 of the arms 30 together to define the vertices of a polygon with the largest possible dimensions.

The intermediate portion 36 of each arm 30 bears on the lower face 22i of the upper panel 22 in such a way that the arm 30 can pivot with respect to the upper panel 22 about a horizontal pivot axis "A" located in this intermediate portion 36.

During the downward movement of the upper panel 22, the intermediate portion 36 of each arm 30 is made to move downwards and the second end 34 of each arm 30 moves downwards with respect to the upper panel 22.

The switch 28 is carried by the lower face 22i of the upper panel 22. The switch 28 is also positioned horizontally inside the polygon defined by the first ends 32 of the arms 30.

According to this aspect of the control device 20, the upper panel 22, the arms 30 and the switch 28 form a module that bears on the upper face 26s of the armature 26.

The assembly formed by the switch 28, by the arms 30, by the support 40 and, where appropriate, by the levers 46 is thus similar to the first example of the invention in which the switch 28 is carried by the armature 26.

The correspondence between the second example and the first example is effected globally by symmetry with respect to a horizontal plane.

Figure 16A:
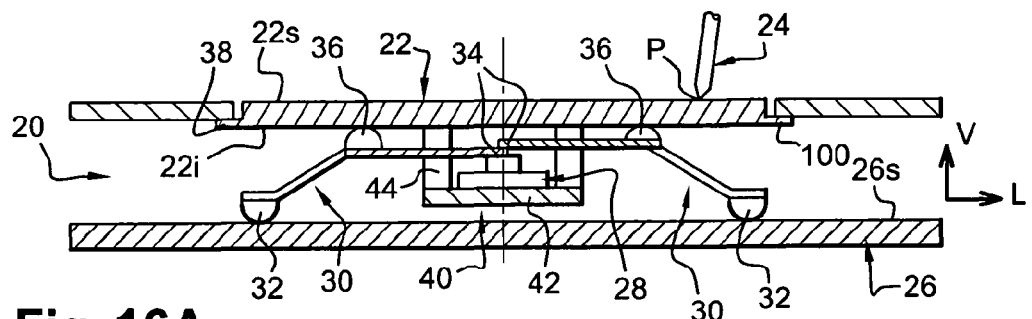
FIGS. 16A and 16B illustrate views similar to those of FIGS. 8A and 8B, in which the switch is carried by the upper panel.
Figure 16B:
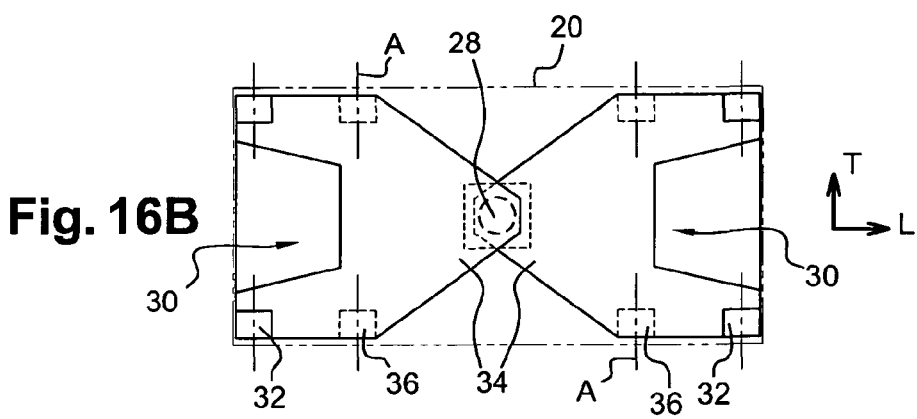

As it may be seen in FIGS. 16A and 16B, according to this second example of the invention the control device 20 has two arms 30 placed between the upper panel 22 and the armature 26 for actuating the switch 28, in a similar manner to the embodiment shown in FIGS. 8A and 8B.

According to this embodiment, the switch 28 is actuated directly by the second end 34 of each arm 30.

The switch 28 is positioned generally horizontally at the centre of the upper panel 22. The two arms 30 are placed longitudinally on either side of the switch 28.

The switch 28 is carried by a support 40 which is itself carried by the upper panel 22, and it is mounted so as to be compressed vertically between the support plate 42 and the second end 34 of each arm 30.

Figure 17A:
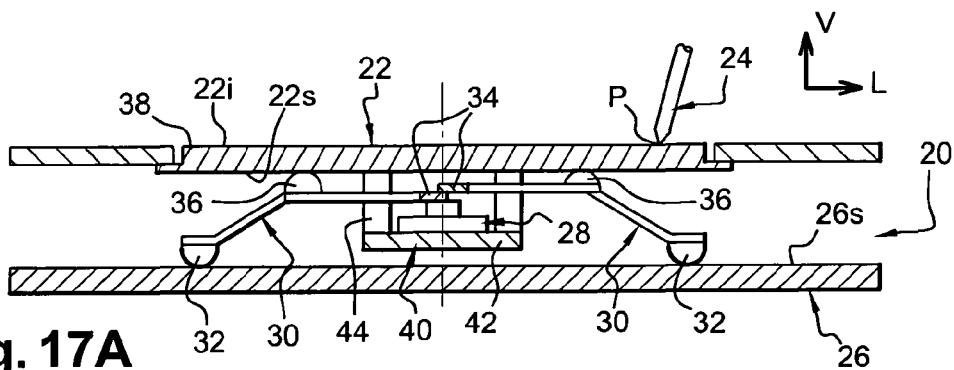
FIGS. 17A and 17B illustrate views similar to those of FIGS. 9A and 9B, in which the switch is carried by the upper panel.
Figure 17B:
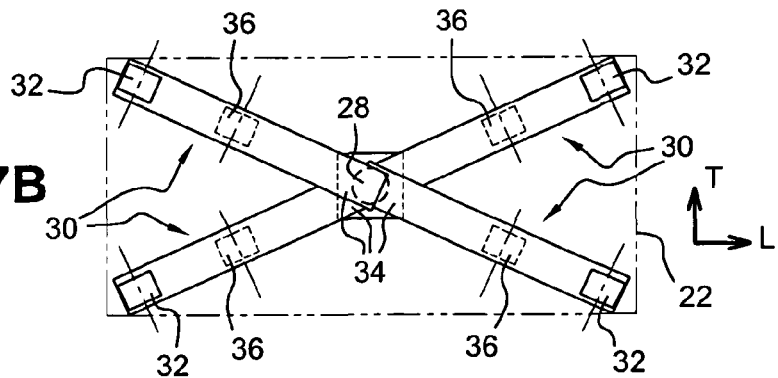

FIGS. 17A and 17B show another variant of the control device, in which the actuating arms 30 are four in number, in a manner similar to the variant shown in FIGS. 9A and 9B.

The switch 28 is positioned at the centre of the upper panel 22, and the arms 30 are distributed around the switch 28.

The switch 28 is mounted so as to be compressed vertically between the support plate 42 of the support 40 and the second end 34 of each arm 30.

Figure 18A:
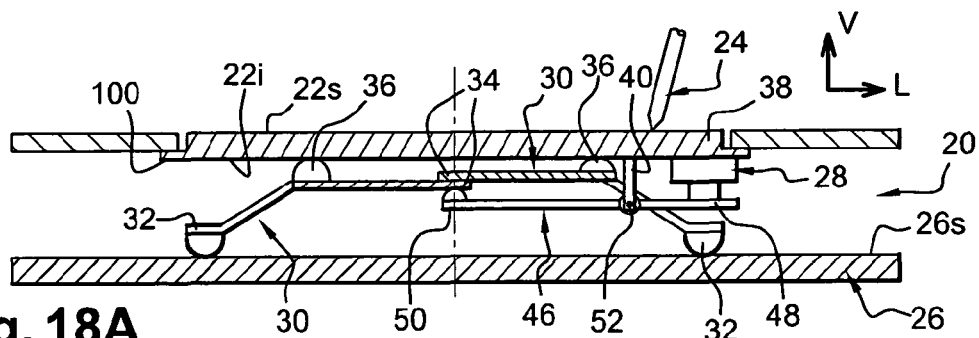
FIGS. 18A and 18B illustrate views similar to those of FIGS. 11A and 11B, in which the switch is carried by the upper panel.
Figure 18B:
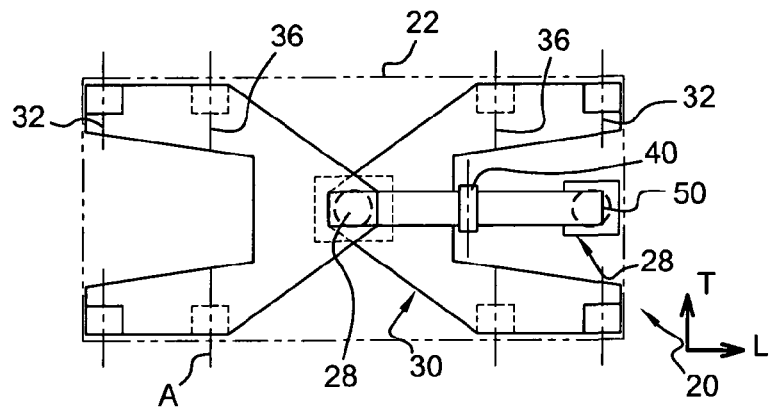

FIGS. 18A and 18B show another variant of the control device, in which the actuating arms 30 are two in number and in which the switch 28 is mounted directly on the lower face 22i of the upper panel 22, in a manner similar to the variant shown in FIGS. 11A and 11B.

In this variant, the switch 28 is actuated by means of a lever 46 which is articulated with respect to a support 40 about a horizontal axis. The support 40 is fixed to the lower face 22i of the upper panel 22.

The switch 28 and the second end 48 of the lever 46 are offset horizontally with respect to the centre of the upper panel 22.

Figure 19A:
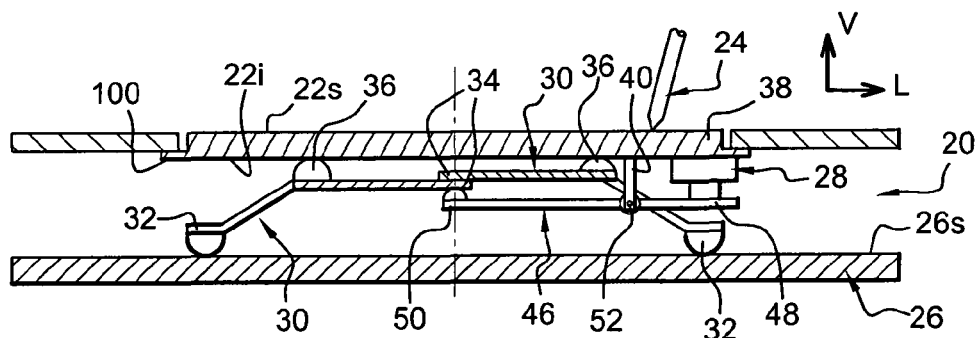
FIGS. 19A and 19B illustrate views similar to those of FIGS. 12A and 12B, in which the switch is carried by the upper panel.
Figure 19B:
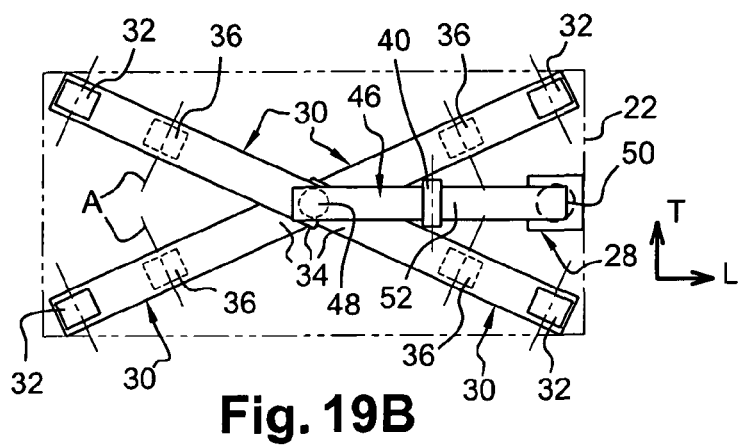

FIGS. 19A and 19B show another variant of the control device, in which the actuating arms 30 are four in number and in which the switch 28 is mounted directly on the lower face 22i of the upper panel 22, in a manner similar to the variant shown in FIGS. 12A and 12B.

As in the variant described above, the switch 28 is actuated by means of a lever 46 which is articulated with respect to a support 40 about a horizontal axis. The support 40 is fixed to the lower face 22i of the upper panel 22.

Each arm 30 is oriented radially with respect to a vertical axis positioned at the centre of the upper panel 22, in which the first end of the lever 46 is positioned.

Figure 20A:
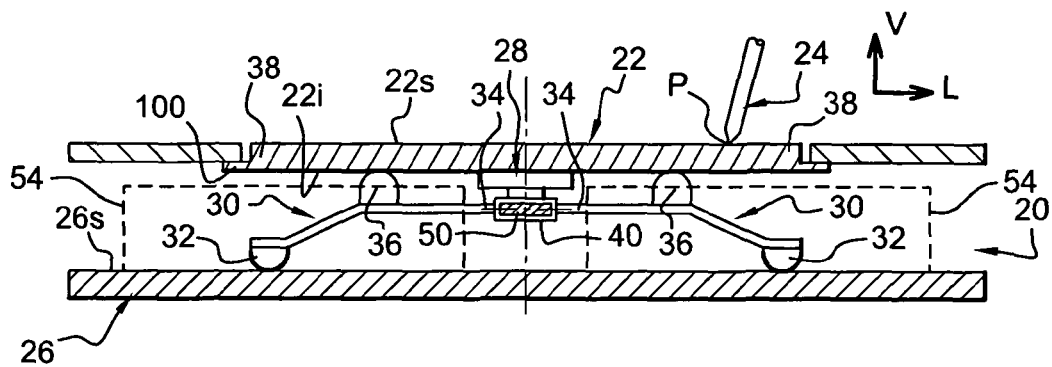
FIGS. 20A to 20C illustrate views similar to those of FIGS. 13A to 13C, in which the switch is carried by the upper panel.
Figure 20B:
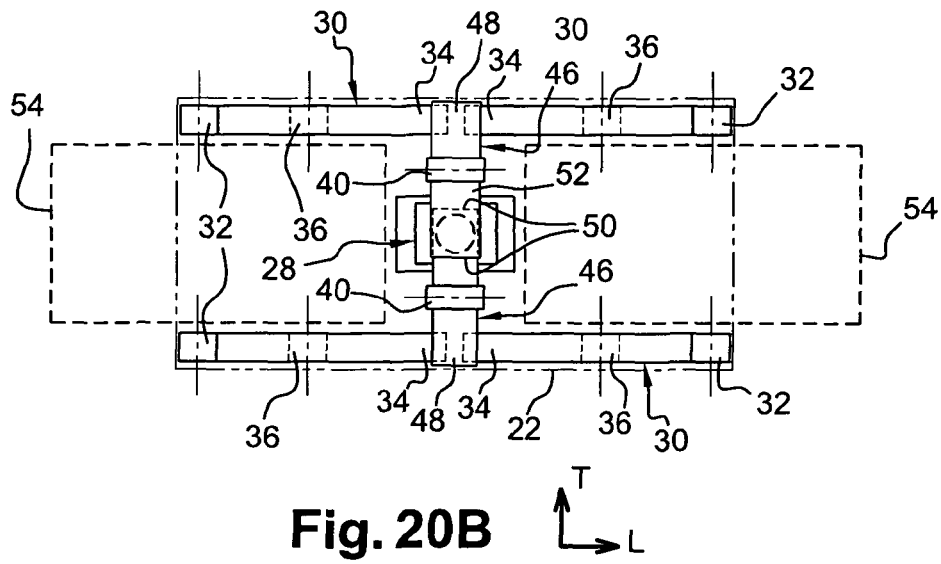
Figure 20C:
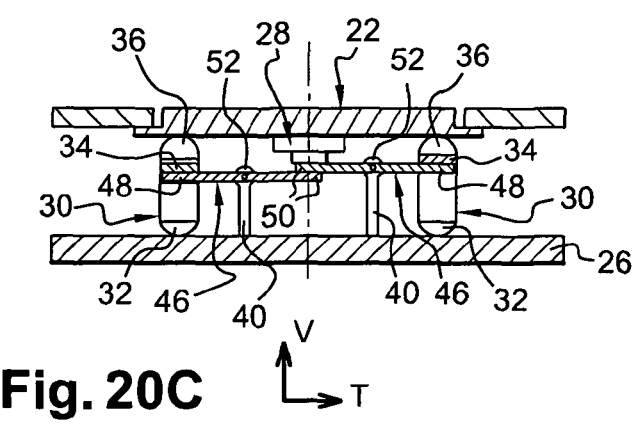

FIGS. 20A to 20C show another variant of the control device, in which the actuating arms 30 are four in number and in which the switch 28 is mounted directly on the lower face 22i of the upper panel 22 and is positioned in line with the centre of the upper panel 22, in a manner similar to the variant shown in FIGS. 13A to 13C.

The arms 30 are grouped in pairs, that is to say here the control device 20 has two pairs of arms 30.

Each pair of arms 30 is positioned along one edge of the upper panel 22, and a lever 46, mounted so as to be articulated with respect to a support 40 fixed to the upper panel 22, is associated with each pair of arms 30.

The lever 46 is oriented here mainly perpendicular to the arms 30 of the associated pair of arms 30, that is to say the lever is here oriented in the transverse direction "T".

In this variant, in a manner similar to the variant shown in FIGS. 13A to 13C, two free zones 54 are delimited horizontally by the arms 30 and the levers 46 and delimited vertically by the upper panel 22 and the armature 26, these free zones 54 receiving no component of the control device.

Figure 21A:
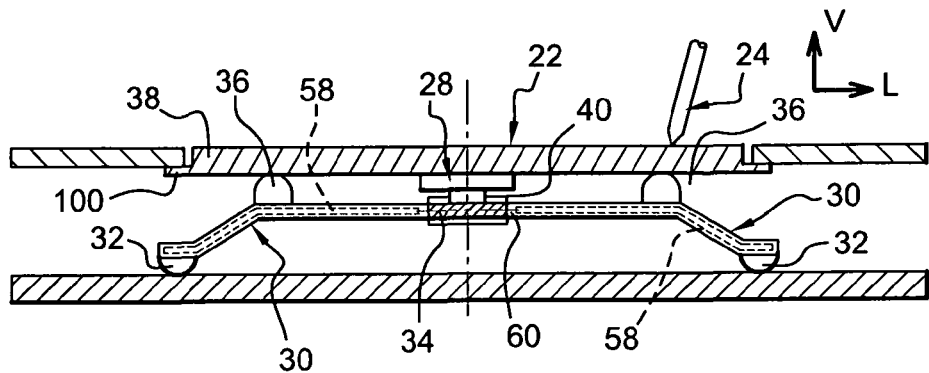
FIGS. 21A to 21C illustrate views similar to those of FIGS. 15A to 15C, in which the switch is carried by the upper panel.
Figure 21B:
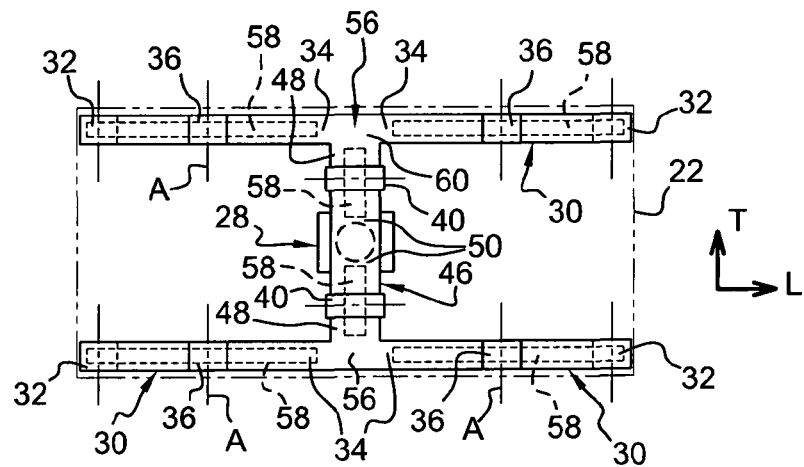
Figure 21C:
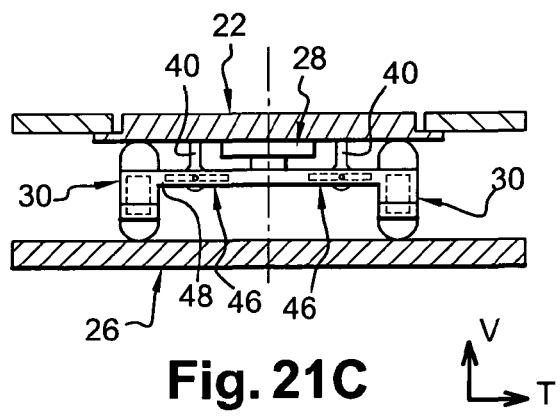

FIGS. 21A to 21C show another variant of the control device, similar to the variant shown in FIGS. 15A to 15C, in which the actuating arms 30 are four in number and are grouped in pairs. According to this variant, the switch 28 is mounted directly on the lower face 22i of the upper panel 22 and is positioned in line with the centre of the upper panel 22.

Each pair of arms 30 is associated with a lever 46 of mainly transverse orientation, which is articulated to a support 40 fixed to the upper panel 22 and is positioned longitudinally at the centre of the upper panel 22.

FIGS. 1 to 7 show an exemplary embodiment of the control device 20 according to the invention for which the arms 30 and the levers 46 are made as a single piece and for which the switch 28 is carried by the armature 26.

As described above with reference to the variant shown in FIGS. 15A to 15C, the first end 32 of each arm bears on the lower face 22i of the upper panel 22 and the intermediate portion 36 of each arm bears downwards on the armature 26.

The arms 30 have a longitudinal main orientation and are grouped in pairs of arms 30, the two arms 30 of a pair of arms being placed along one longitudinal edge of the upper panel 22.

The control device 20 has two levers 46 of transverse main orientation, each of which is associated with a pair of arms 30, and each lever 46 is articulated with respect to a support 40 fixed to the armature 26.

The switch 28 has a cylindrical body 96 which carries connection tabs 76 of the switch 28, by means of which the switch 28 is electrically connected to a circuit for controlling the electronic apparatus.

The switch 28 also has a top pushbutton 98 on which the second ends 50 of the levers 46 bear in order to actuate the switch 28.

The upper panel 22 here is a flat horizontal element of rectangular shape with a longitudinal main orientation, i.e. its long sides are parallel to the longitudinal orientation "L".

The control device is intended to be mounted in the electronic apparatus in such a way that the upper face 22s of the upper panel 22 is flush with a covering element or case of the electronic apparatus (not illustrated in FIGS. 1 to 7).

Each edge 38 of the upper panel 22 has a peripheral rim 100 which is positioned vertically set back with respect to the upper face 22s of the upper panel 22 and is intended to be received beneath the covering element.

Thus, the rim 100 of the upper panel 22 cooperates with the covering element so that the upper panel 22 abuts against the covering element in a high, rest position, and for positioning the upper panel 22 horizontally and transversely with respect to the covering element.

Figure 2:
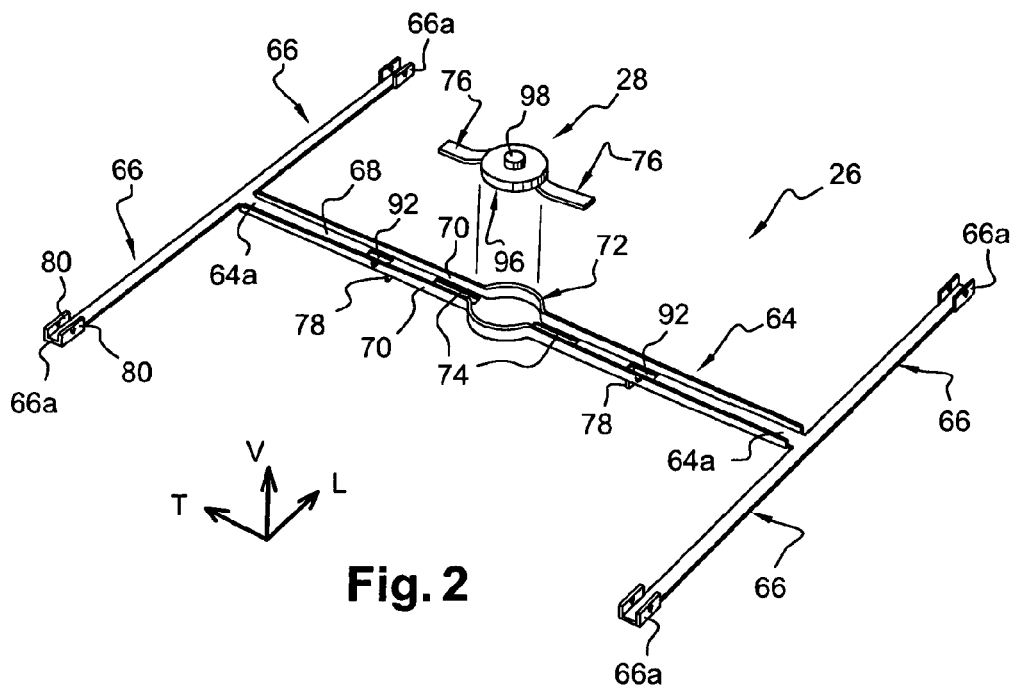
FIG. 2 illustrates a detail on a larger scale of the armature of the control device illustrated in FIG. 1.

As it may be seen in FIG. 2, the armature 26 here takes the form of a piece made of sheet metal, which has been cut, bent and stamped.

The armature 26 is generally in the form of an "H" when seen from above and it comprises a central beam 64 of transverse main orientation and rails 66 that extend longitudinally on either side of each transverse end 64a of the beam 64.

The cross-section of the beam 64, along a vertical longitudinal plane, is in the form of a U open at the top. In cross-section, the beam 64 has a horizontal base 68 of transverse main orientation and two transverse vertical flanges 70 that extend, vertically upwards, each longitudinal edge of the base 68.

A central part 72 of the beam 64 is formed in order to receive the switch 28. The central part 72 here has a circular shape complementary to the shape of the body 96 of the switch 28.

The base 68 of the beam 64 has two openings 74 placed on either side of the central part 72, the connection tabs 76 of the switch 28 being intended to extend through said openings.

The armature 26 is produced so as to be mounted on a component-carrying support plate 94 of the electronic apparatus.

For this purpose, the base 68 of the beam 64 has feet 78 which have been cut out and bent vertically downwards and which are capable of being received in associated holes (not shown) in the component-carrying support plate 94 on which the control device 20 is mounted.

Each rail 66 of the armature 26 consists of a horizontal strip that extends longitudinally in both directions from one end 64a of the beam 64.

According to one embodiment, each rail 66 is flexible so as to adapt to the shape of the component-carrying support plate on which the armature 26 is mounted. According to another embodiment, the rails 66 are rigid and do not deform vertically.

The free end 66a of each rail 66 is positioned longitudinally proximal to each intermediate portion 36 of an arm 30 and has bent-up portions 80 that are intended to cooperate with the associated intermediate portion 36 of an arm 30.

Figure 3:
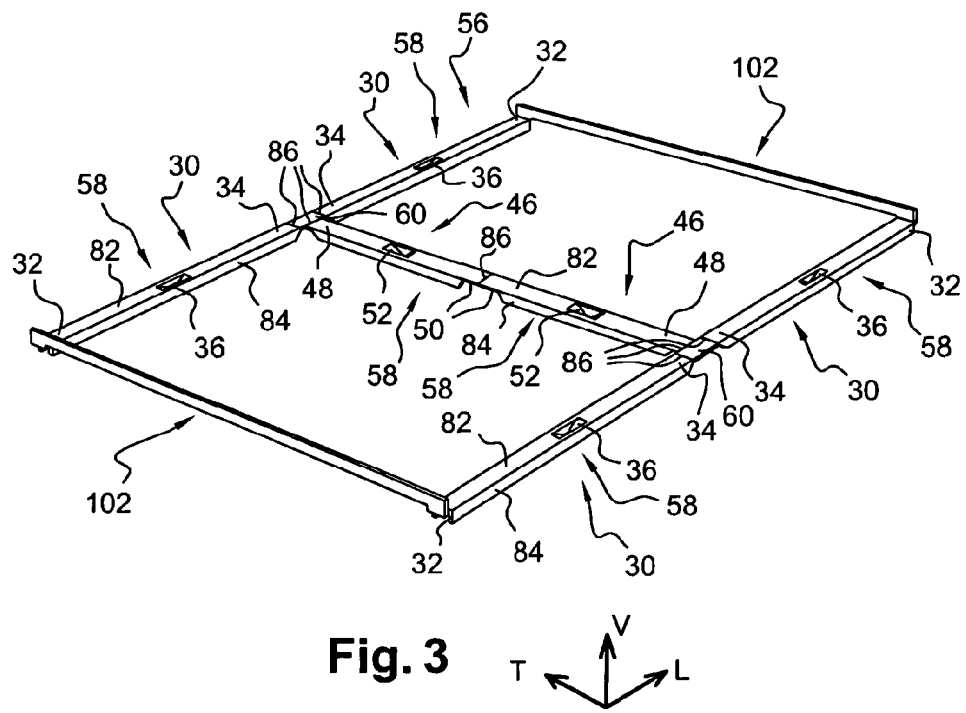
FIG. 3 illustrates a detail on a larger scale of the single part, illustrated in FIG. 1, comprising the levers and the arms.

As illustrated in FIG. 3, the arms 30 and the levers 46 are made as one piece 56 made of sheet metal, which has been cut, bent and stamped to form a metal frame in the shape of an "8" in top view.

As described above, the one piece 56 has straight sections 58 forming the arms 30 or the levers 46, and has portions 60 forming means for linking and articulating the arms 30 and the levers 46 together.

Each straight section 58 is made so as not to deform when the control device 20 is subjected to a control action.

To this end, the cross-section of each straight section 58, taken along a plane perpendicular to said section 58, is in the form of a U open downwards, which is made up of an upper horizontal portion 82 and two lateral vertical portions 84.

The two arms 30 of a pair of arms are aligned longitudinally and are connected together at their second ends 34 via a linking and articulating portion 60.

This linking and articulating portion 60 connects the first end of a lever 46 to the second ends of the arms of the associated pair of arms 30.

The linking and articulating portion 60 consists here of a generally rectangular horizontal plate, each transverse longitudinal end edge of which is connected to a second end 34 of an arm 30 via a strip of material having a low elastic resistance to deformation. A longitudinal internal transverse end edge is connected to the first end of the associated lever 46 via a strip of material having a low elastic resistance to deformation.

The second ends 50 of the levers 46, which bear directly on the switch 28, are connected together via another strip of material 86 having a low elastic resistance to deformation.

During the upward or downward movement of the upper panel 22, the strips of material 86 deform elastically. They thus form means for articulating the arms 30 and the levers 46 together.

The one piece 56 also has two transverse rods 102 which connect the first ends 32 of two arms 30 together, each rod being positioned at a longitudinal end of the one piece 56.

The rods 102 allow the first ends 32 of the two arms belonging to two different pairs to move vertically in an identical manner, so as to guarantee that the upper panel 22 remains horizontal during this movement.

In addition, the rods 102 ensure longitudinal positioning of the upper panel 22 with respect to the arms 30.

Figure 5:
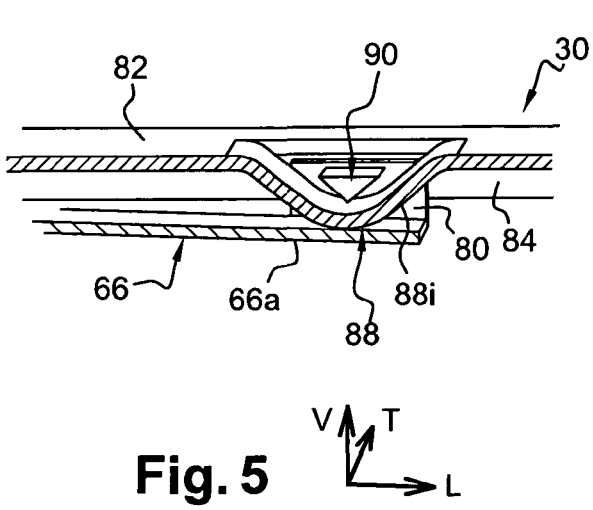
FIG. 5 illustrates a sectional view, along a vertical longitudinal plane of the device illustrated in FIG. 1, showing a detail of the articulation of an arm with respect to the armature.

As it may be seen in greater detail in FIG. 5, the intermediate portion 36 of each arm 30 has a stamped lug 88 made from the horizontal portion 82 of the arm 30, in said intermediate portion 36.

The lug 88 is in the form of a U open at the top and projecting downwards with respect to the horizontal portion 82. The lower end of the lug 88 has a downwardly curved convex shape and bears downwards on the free end 66a of a rail 66 associated with the armature 26.

Due to the lug 88 bearing on the rail 66, it is possible for the arm 30 to pivot with respect to said rail 66 about a transverse pivot axis defined by the line of contact between the lower face 88i of the lug 88 and the free end 66a of the rail 66.

Each vertical portion 80 of the free end 66a of the rail 66 has a boss 90 which projects transversely towards the other vertical portion 80 and which is positioned above and at a certain distance away from the lower end of the stamped lug 88.

The cross-section of each boss 90, in a vertical longitudinal plane, is in the form of a "V" having its tip oriented downwards. The transverse distance between the facing bosses 90 is less than the transverse width of the stamped lug 88.

The stamped lug 88 is mounted on the free end 66a of the rail 66, and is therefore inserted between the bosses 90, by elastic snap-fitting. The bosses 90 prevent the arms 30 from separating from the armature 26.

Figure 4:
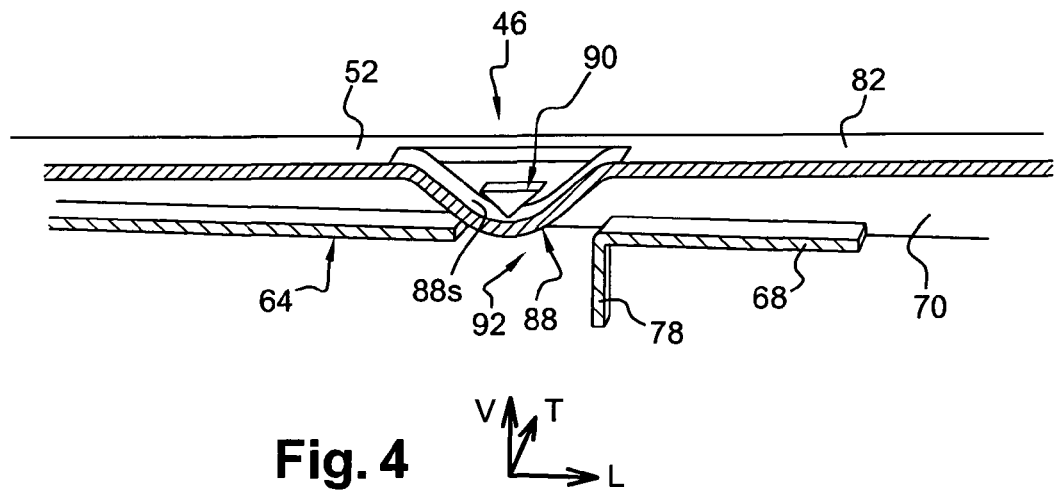
FIG. 4 illustrates a sectional view, along a transverse vertical plane, of the device illustrated in FIG. 1, showing a detail of the articulation of a lever with respect to the armature.

As may be seen in greater detail in FIG. 4, the intermediate portion 52 of each lever 46 has a stamped lug 88 made from the horizontal portion 82 of the lever 46, in said intermediate portion 52.

This stamped lug 88 of the lever 46 is intended to cooperate with a boss 90 formed so as to project longitudinally with respect to the internal face of each flange 70 of the central beam 64.

The cross-section of each boss 90 in a transverse vertical plane takes the form of a "V", the lower tip of which is oriented downwards.

The concave upper face 88s of the stamped lug 88 bears upwards on the lower tip of each of the two bosses 90, thus forming the articulation of the lever 46 to the armature 26 about an approximately longitudinal pivot axis.

Consequently, the bosses 90 and the flanges 70 of the central beam 64 form a support 40 associated with the lever 46.

In addition, each foot 78 of the central beam 64 is positioned here transversely level with a boss 90, in such a way that the material constituting said foot 78 clears an opening 92 in the base 68 positioned beneath the boss 90.

This opening 92 prevents the stamped lug 88 from coming into contact with the base 68, the pivoting of the lever 46 therefore not being impeded.

FIGS. 6 and 7 present cross-sectional half-views of the control device 20 showing, on the left, the rest position of the control device 20 and, on the right, the actuated position of the control device, for which a control action has been exerted on the upper face of the upper panel.

As may be seen in FIG. 6, when the control action is exerted on the upper face 22s of the upper panel 22, each arm 30 pivots in its intermediate portion 36 about a transverse axis, in such a way that its first end 32 moves downwards, with the same movement as the upper panel 22, and the second end 34 of the arm 30 moves upwards.

At the same time, the movement, shown in FIG. 7, of the levers 46 consists of a pivoting movement of its intermediate portion 52 in such a way that its first end 48 moves upwards with the same movement as the second end 34 of each arm 30, and the second end 50 of the lever 46 moves downwards and bears on the pushbutton 98 for actuating the switch 28.

The control device 20 according to the invention is compact and all its components are housed in a space bounded horizontally by the peripheral edges 38 of the upper panel 22 and bounded vertically by the upper panel 22 and the armature 26.

In addition, since the second end 34 of each arm 30 bears upwards on the switch 28, either directly or indirectly via the levers 46, the assembly formed by the upper panel 22 and the arms 30 cannot pivot with respect to the support plate about a pivot axis defined by an intermediate portion 36 of an arm, even when the contact point "P" is positioned close to a peripheral edge 38 of the upper panel 22.

The arms 30, the switch 28 and the support 40 cooperate with one another so as to guide the upper panel 22 in its vertical movement and to keep the upper panel 22 parallel to its horizontal main plane.

The articulated structure formed by the arms 30, and as the case may be the levers 46, is designed in such a way that the bearing force resulting from the control action is distributed over each arm 30 and is redirected in its entirety towards the switch 28.

The dimensions of the arms 30 and of the levers 46 are defined in such a manner that the lever arm of each arm 30 and the lever arm of each lever 46 is the same for all the arms and is the same for all the levers 46.

This lever arm is for example defined by the ratio of the distance between the first end 32, 46 and the intermediate portion 36, 52 of the arm 30 or of the lever 46 to the distance between the intermediate portion 36, 52 and the second end 34, 50 of the arm 30 or of the lever 46.

Consequently, the switch 28 is actuated when the pressure of the action is greater than a defined value, independently of the location of the contact point "P" on the upper face 22s of the upper panel 22.

In addition, the choice of the lever arm for the arms 30 and for the levers 46 makes it possible to predefine the pressure of the control action causing the switch 28 to be actuated.

This choice of the lever arm also makes it possible to determine the vertical movement travel of the upper panel 22.

The invention has been described with reference to a control device having either two or four arms 30 that are placed symmetrically with respect to a vertical longitudinal midplane of the control device 20.

It will be understood that the invention is not limited to these embodiments and that the number of arms 30 and the number of levers 46, together with their orientations, may be different from the embodiments described.

For example, the control device 20 may have a larger number of arms 30, for example eight arms 30 grouped in pairs, which are associated with a total of four levers 46. This example is suitable for an upper panel 22 having an octagonal or circular shape.

Thus, the arms 30 and/or the levers 46 need not be oriented longitudinally or transversely, but may be inclined to the longitudinal direction "L" and to the transverse direction "T".

In addition, in the above description, the main orientation of the control device 20 is horizontal, i.e. the upper panel 22 is horizontal.

It will be understood that the control device 20 according to the invention may be oriented differently, since the Earth's gravity has no influence on the operation of the control device 20.

For example, the control device 20 may be oriented vertically, that is to say the upper panel 22 lies in a vertical plane.

The weight of the upper panel 22 is then not supported by the arms 30 and the armature 26, thereby making it possible to use an upper panel of large size and large mass, without any risk of damaging the control device 20. Separate means for supporting the upper panel will then be provided in order to position the upper panel 22 with respect to the arms 30 and to the armature 26.

According to yet another aspect of the control device, especially when the upper panel is of large mass, counterweights are installed on the arms and/or on the levers so as to compensate for the mass of the upper panel 22.

Thus, despite the mass of the upper panel 22, no action is exerted on the switch 28 when the user exerts no control action. There is therefore a lower risk of the switch 28 being actuated unintentionally.

The control device 20 according to the invention forms one module of the electronic apparatus, which is independent in its structure and its operation with respect to the other components of the electronic apparatus.

It is thus possible for the complete control device 20 to be mounted entirely and tested on a dedicated station, especially by a subcontractor of the electronic apparatus manufacturer.

By testing the complete control device 20 before it is assembled, this test may be simplified, and only functional control devices 20 may be delivered.

Figure 22:
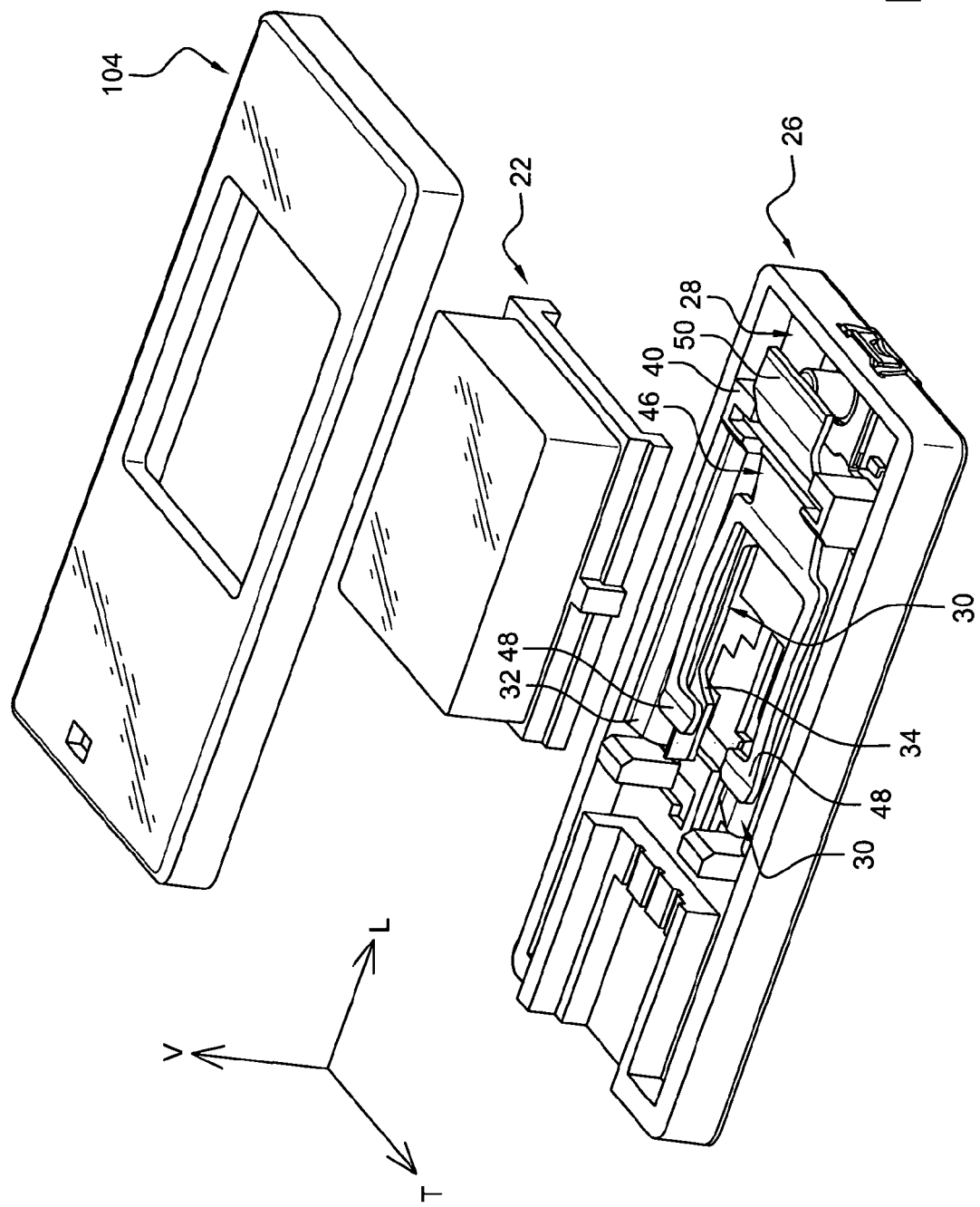
FIG. 22 illustrates a perspective exploded view of an example of the invention in which the control device comprises two actuating arms and one lever articulated with respect to the armature, corresponding to the principles of FIGS. 11A and 11B, being used for the control of a "warning signal" in a car vehicle.
Figure 23:
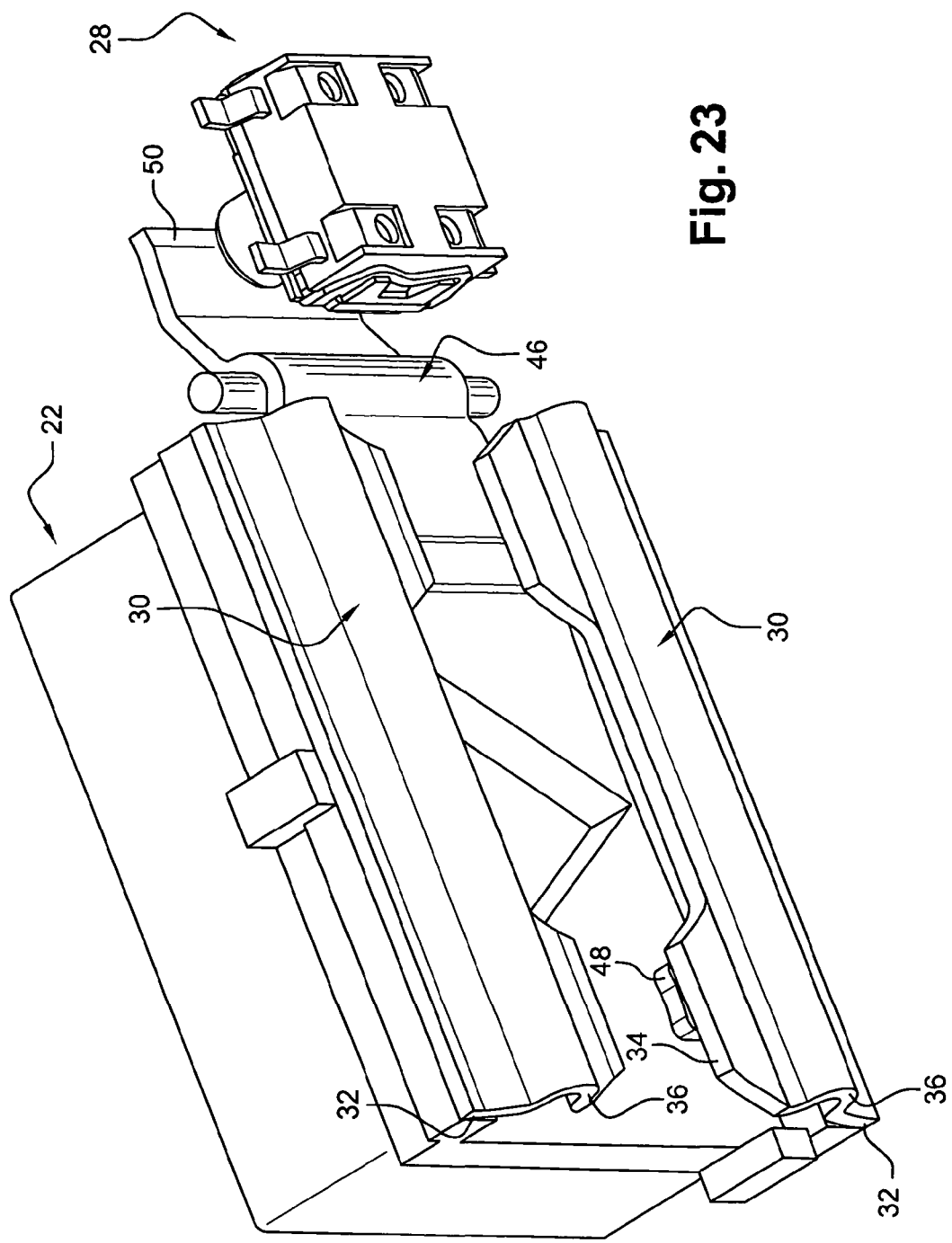
FIG. 23 illustrates an under view of some of the components of the control device illustrated in FIG. 22.

FIG. 22 illustrates an embodiment similar to the one of FIGS. 11A and 11B, in which the upper panel 22 is a control button used in a car vehicle as a "warning button".

The armature 26 is the lower part of a two parts casing also comprising an upper cover 104, both being plastic moulded parts.

When compared with the one schematically illustrated in FIGS. 11A and 11B, the orientation of the lever 46 is transversal.

It is thus possible to have a large button and to implement a light source on the upper face of the armature 26 between the two arms 30 and the two parallel and transversal branches of the lever 46 terminating in a "double" first end 48.

Figure 24:
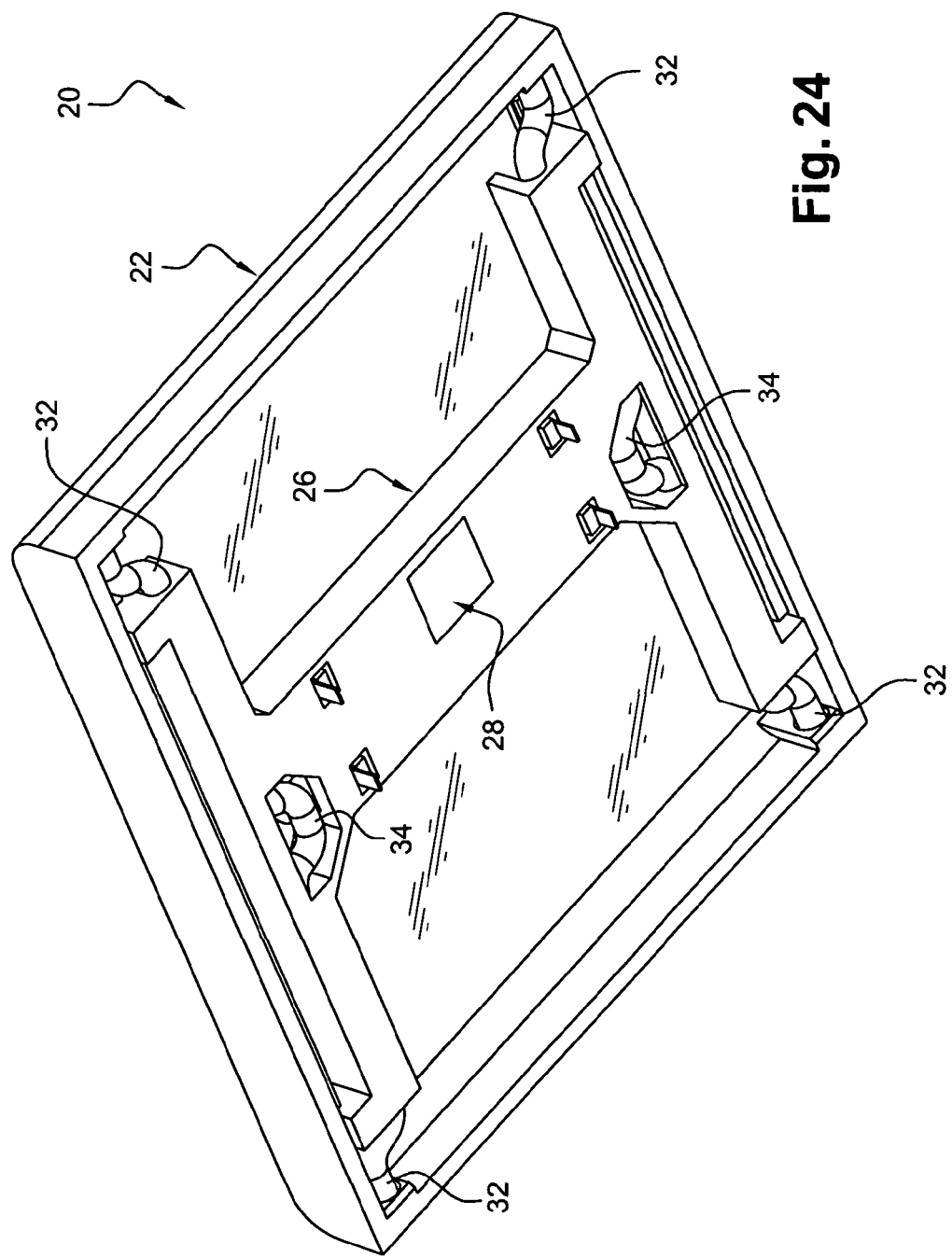
FIG. 24 illustrates an under perspective view of another example of the invention in which the control device comprises two actuating arms and one lever articulated with respect to the armature, corresponding to the principles of FIGS. 11A and 11B.
Figure 25:
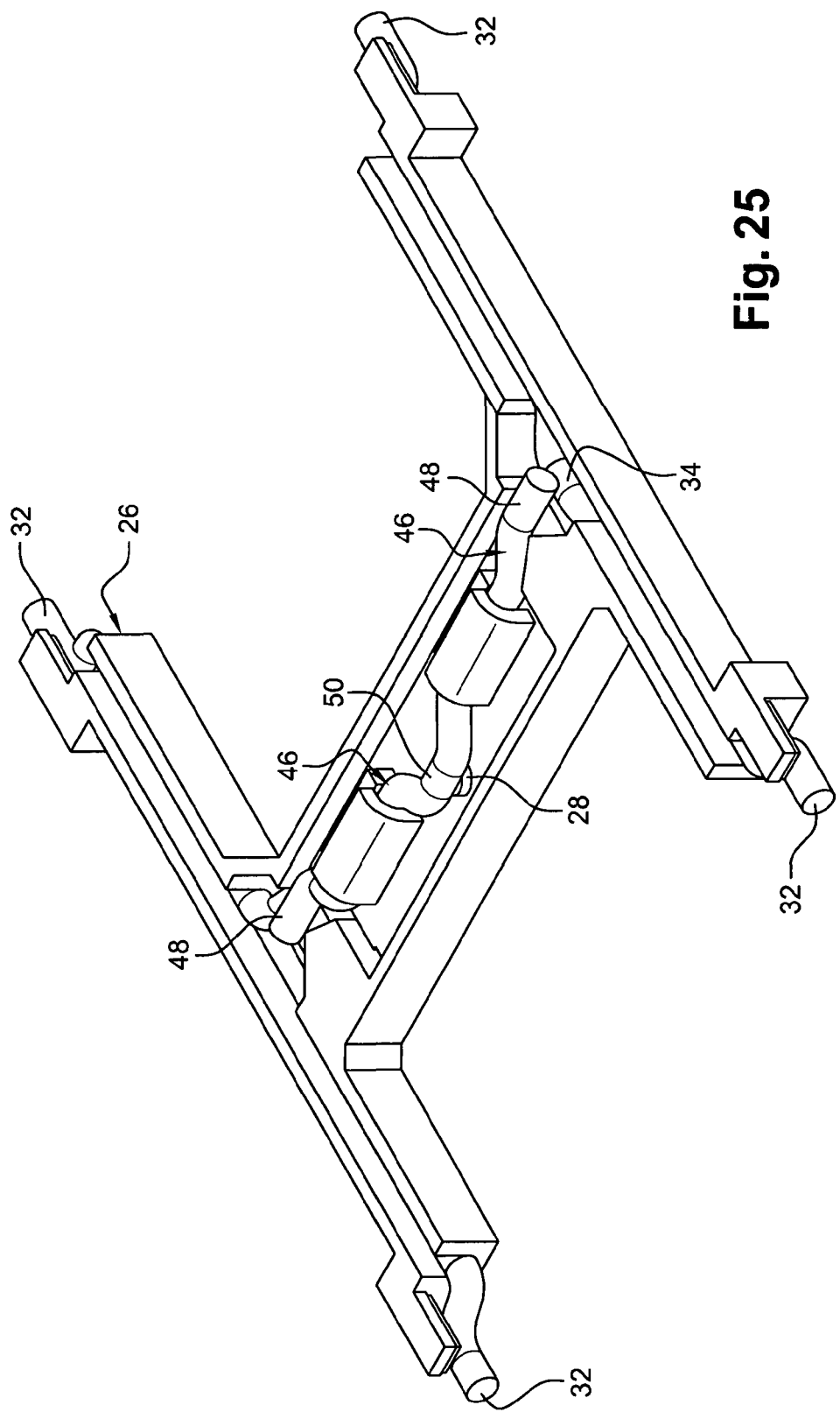
FIG. 25 illustrates an upper perspective view of the control device of FIG. 24, illustrated without the upper panel.
Figure 26:
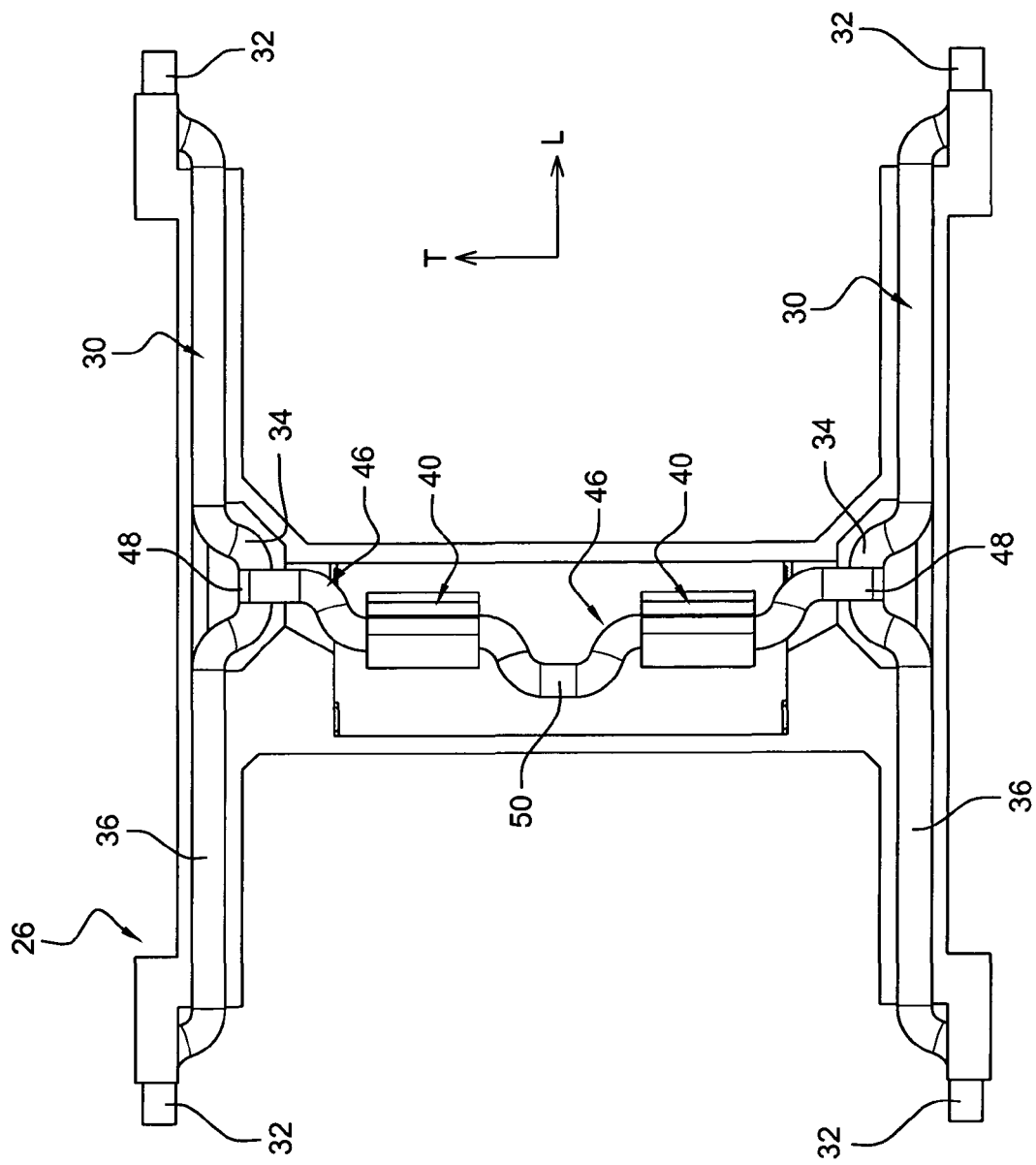
FIG. 26 illustrates a top view of the components of FIG. 25.

FIGS. 24 to 26 illustrate another example in which the upper panel 22 is in the form of a plastic moulded plate in which the two arms 30 are rotatably mounted by their first ends 32.

The lower armature 26 is also a plastic moulded "frame" in the form of an "H" similar to the frame armature 26 illustrated in FIGS. 1 and 2. The switch 28 is thus centrally arranged.

The two levers 46 are made as a single piece in the form of a bent transversal rod or wire permitting its torsional elastic deformation to a limited extent when the control device 20 is actuated.

Each one of the two arms 30 is also in the form of a bent rod or wire permitting its torsional elastic deformation to a limited extent when the control device 20 is actuated.

The fact that the torsion is used in these rods or wires 30 and 46, instead of the flexion, permits to provide a very compact control device with a high rigidity, despite the small diameter of the rods. This also provides with a very short travel of the upper panel/button 22.

The components are assembled in a manner such that the rods 30 and 46 are initially under a slight torsional tension avoiding any play and defining very precise respective positions of the various components.

Figure 27:
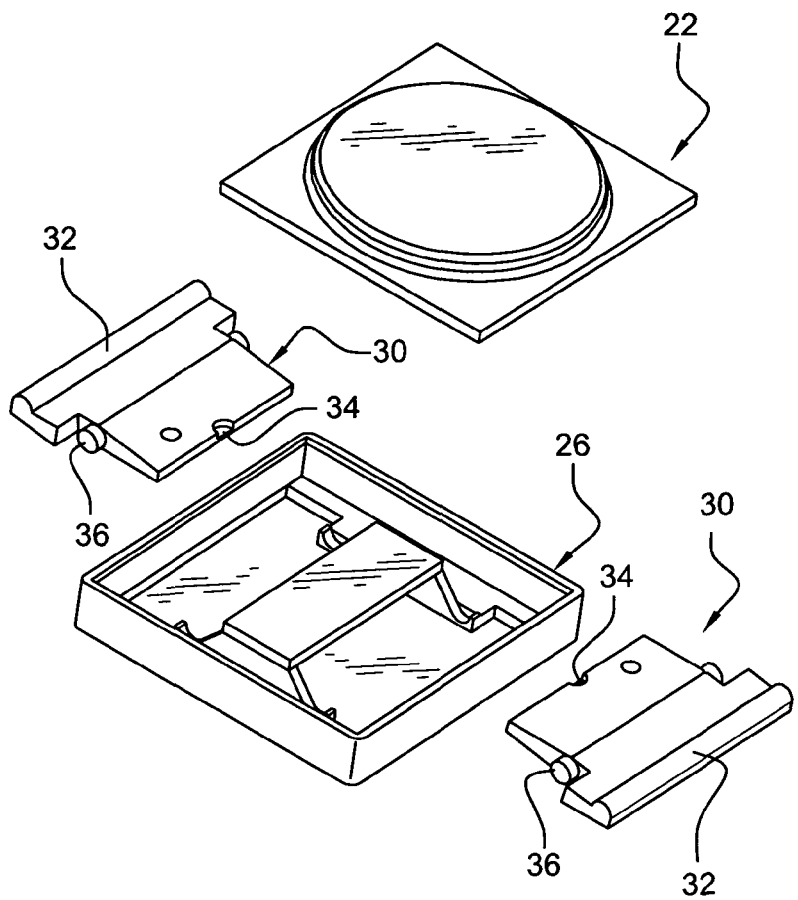
FIG. 27 illustrates a partially exploded upper perspective view of an example of the invention in which the control device comprises two actuating arms, corresponding to the principles of FIGS. 8A and 8B.
Figure 28:
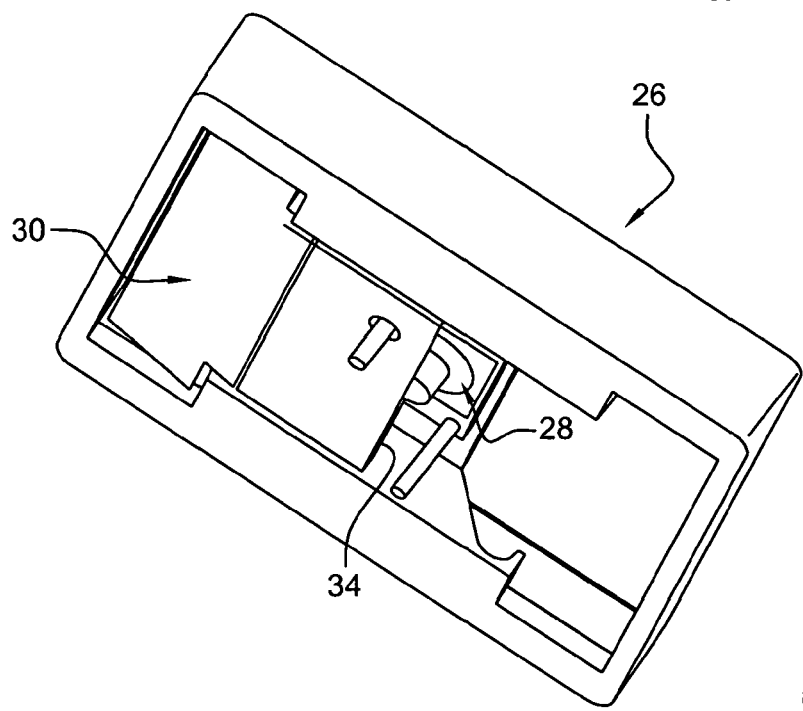
FIG. 28 illustrates an under perspective view showing some of the components illustrated in FIG. 27.
Figure 29:
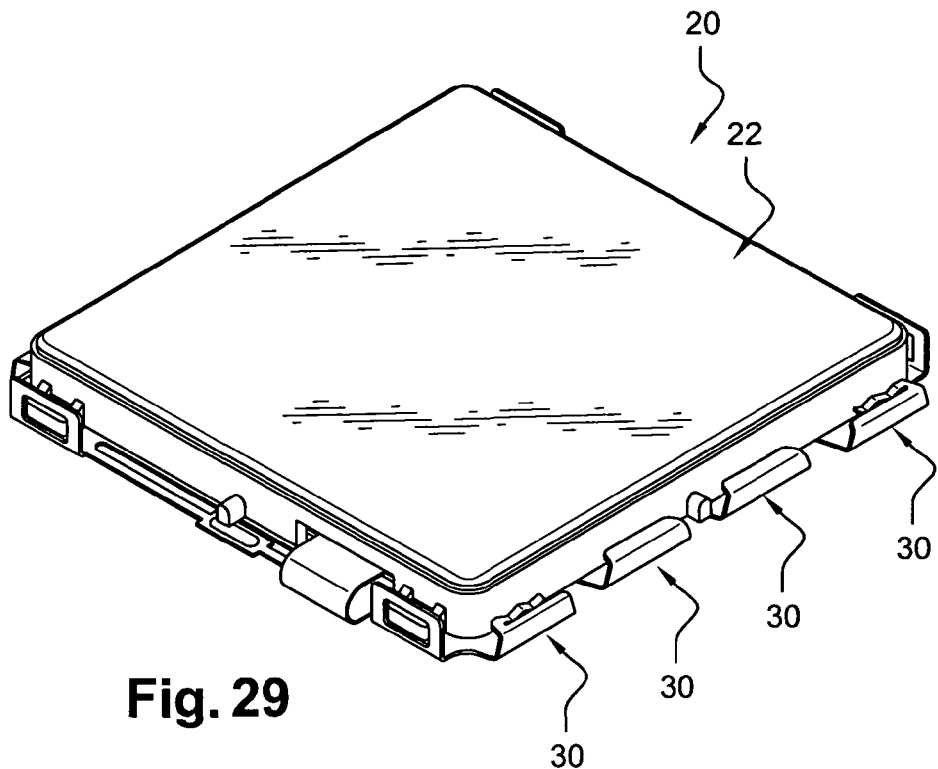
FIG. 29 illustrates an upper perspective view of an example of a control device comprising two arms and two levers made of a stamped sheet of metal.
Figure 31:
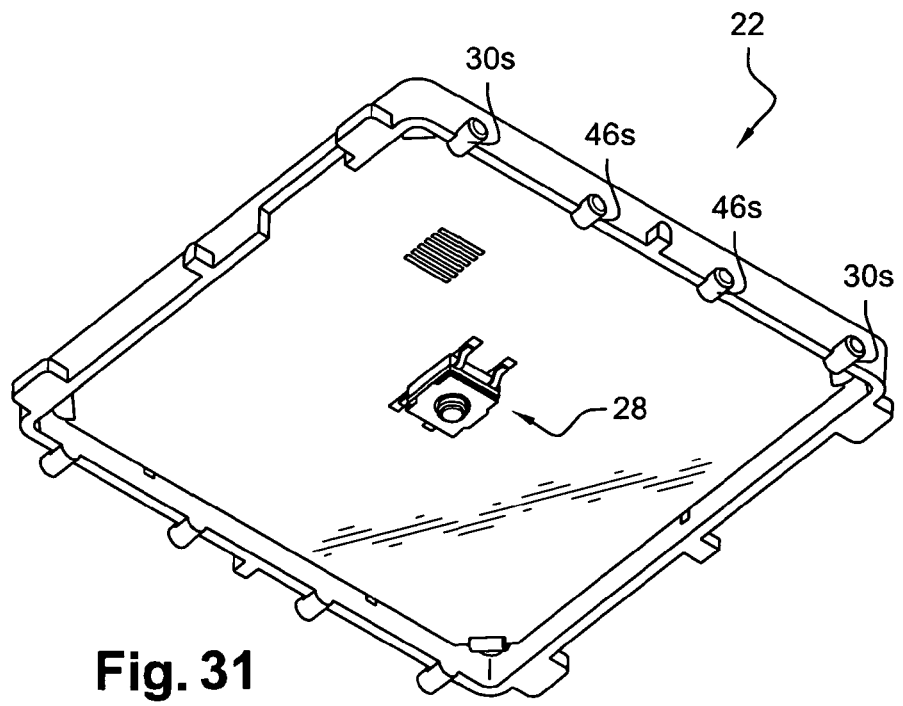
FIG. 31 illustrates an under perspective view of the upper panel of the control device of FIG. 29 equipped with its switch.
Figure 30:
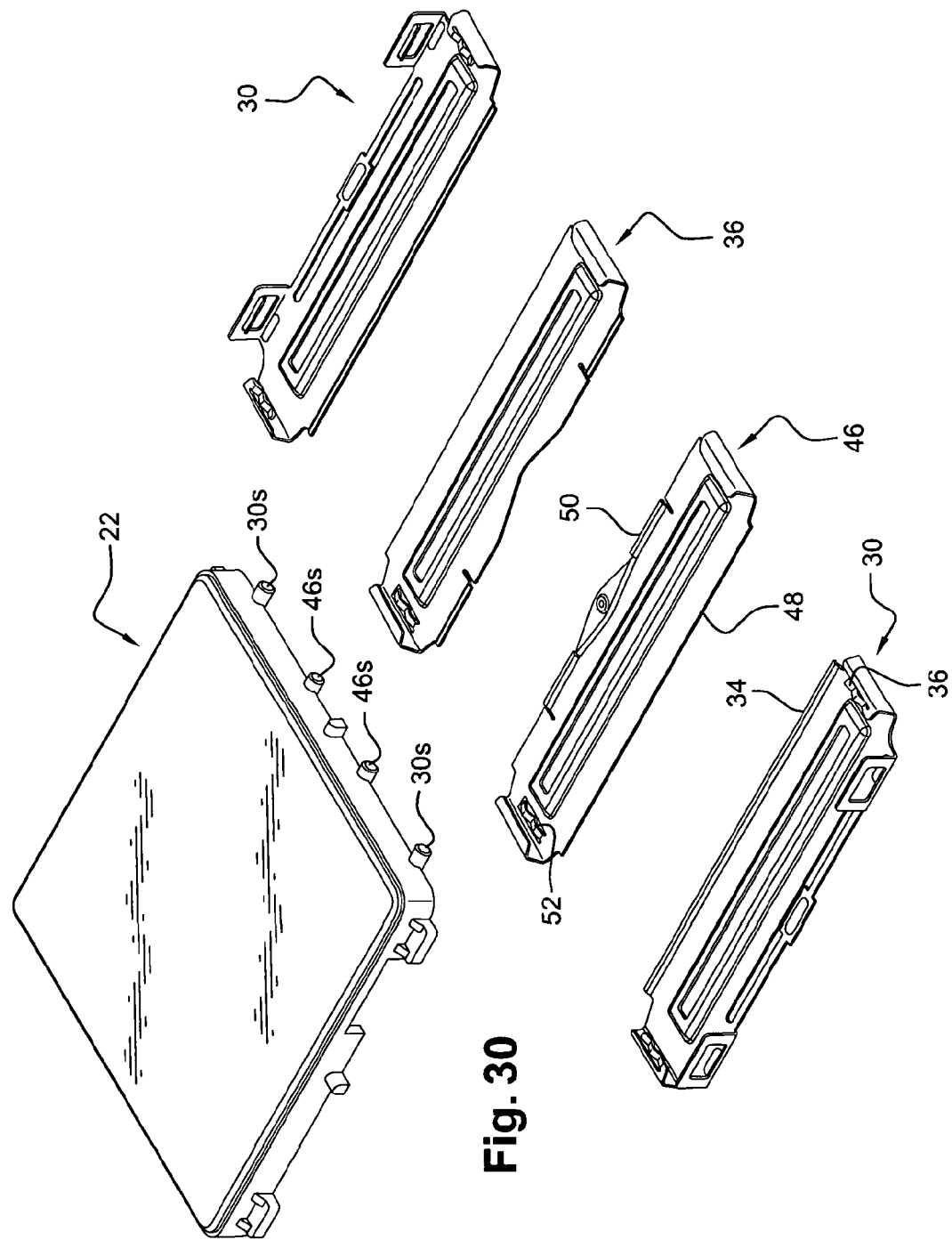
FIG. 30 illustrates a view similar to the view of FIG. 29 showing the two arms and two levers exploded.
Figure 32:
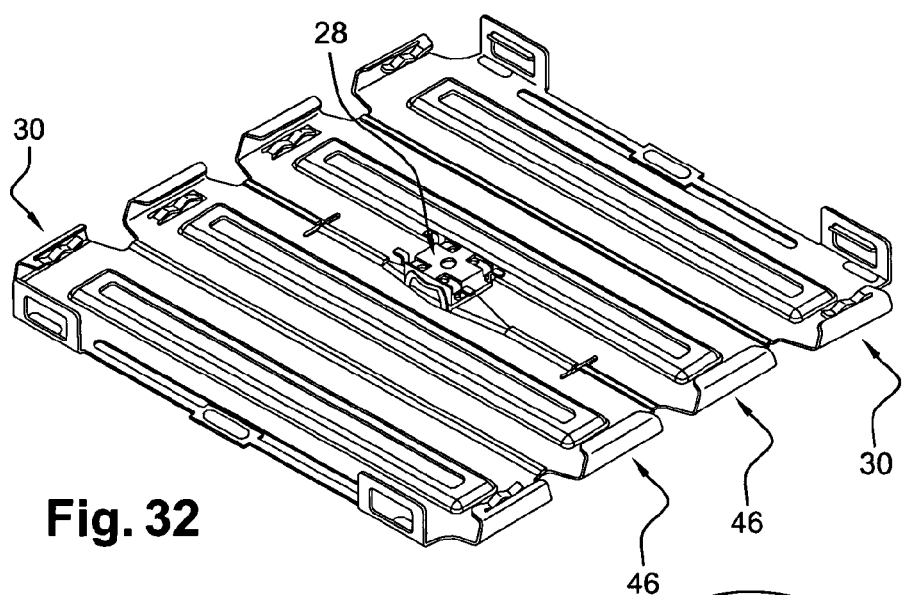
FIG. 32 illustrates an upper perspective view of the two arms and two levers assembled and of the switch.
Figure 33:
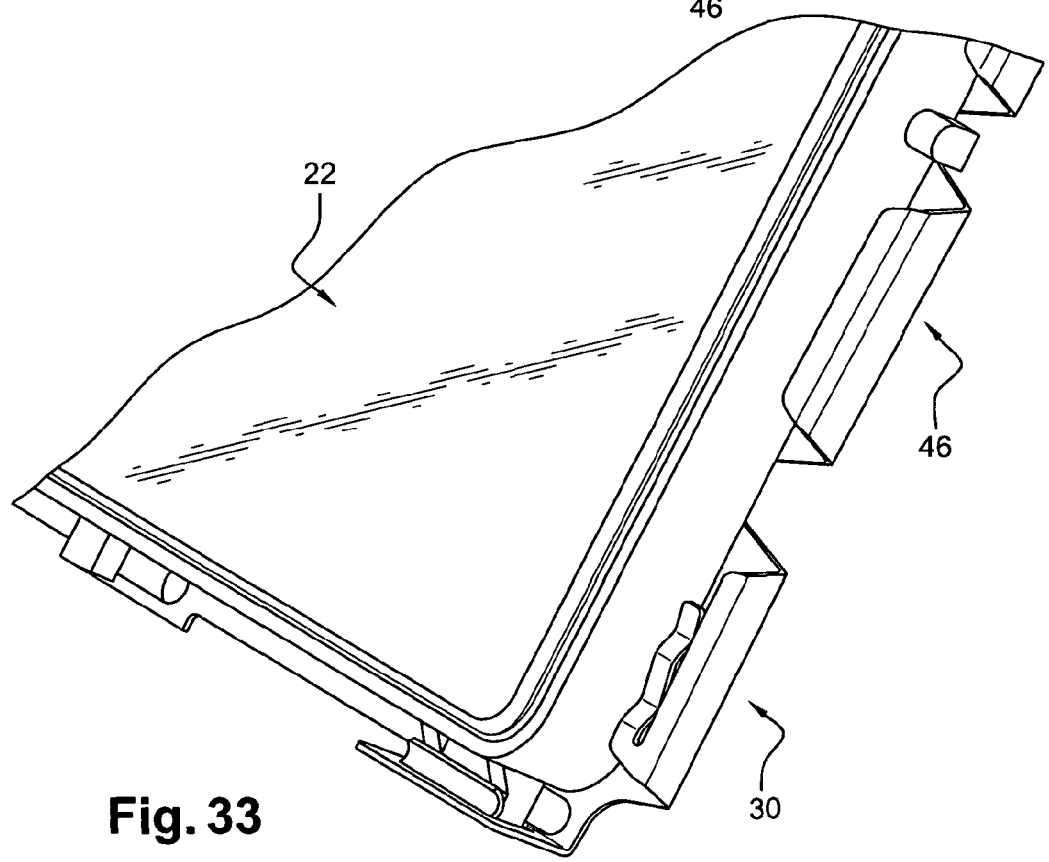
FIG. 33 illustrates an enlarged detail of FIG. 29.

FIGS. 27 and 28 illustrate an example of a control device on the basis of the principles illustrated in FIGS. 8A and 8B.

It can be seen how the armature 26 and the two arms 30 can be realized in plastic moulded parts.

In the example illustrated in FIGS. 29 through 33, the switch 28 is actuated by means of two pairs of associated arms 30 and levers all made by stamping a metal sheet.

The upper plastic moulded panel 22 includes four pairs of aligned shafts 30s and 46s for articulating the arms 30 and levers 46 respectively.

The arms 30 and levers 46 have facing complementary cooperating transversal edges so that the various movements are transmitted from one to the other, and also to create a "structure" which makes a whole, being made of the upper panel 22, the switch 28 and the levers 30 and arms 46. Such a structure can directly be positioned on an under (not shown) supporting plate.

The invention claimed is:

1. A device for controlling an electronic apparatus, comprising:
    a generally flat and horizontal upper panel on an upper face of the device, wherein a control member is capable of exerting a control action comprising a compressive force oriented generally downwards;
    a lower armature of a support, wherein the upper panel can move in a generally vertical downward manner under the effect of the control action with respect to the lower armature;
    a switch, wherein the switch is carried by the lower armature and can be actuated under the effect of the control action in order to produce a signal for controlling the electronic apparatus; and
    at least two arms for actuating the switch, wherein each of the at least two arms comprises:
        a first end that bears vertically upwards on a lower face of the upper panel,
        a second end that bears on the switch, and
        an intermediate portion that bears vertically downwards on an upper face of the lower armature, wherein the at least two arms can pivot about a horizontal geometric pivotal axis around the intermediate portion;
    wherein each of the at least two arms cooperate with the upper panel and the lower armature in order to keep the upper panel parallel to a horizontal plane during its vertical movement with respect to the lower armature, and
    wherein the at least two arms bear on the switch by use of at least one lever that is articulated to a support about a horizontal axis, and the support is stationary with respect to the armature.

2. A device for controlling an electronic apparatus according to claim 1, wherein the switch is interposed vertically between the second end of each of the at least two arms and at least one support that is stationary with respect to the lower armature.

3. A device for controlling an electronic apparatus according to claim 1, wherein the at least one lever has a first end on which the second end of each of the at least two arms bears and a second end which bears directly on the switch.

4. A device for controlling an electronic apparatus according to claim 1, wherein a plurality of counterweights are installed on the at least one lever, so as to compensate for a mass of the upper panel.

5. A device for controlling an electronic apparatus according to claim 1, wherein the first end of each of the at least two arms is positioned horizontally in line with a peripheral edge of the upper panel.

6. A device for controlling an electronic apparatus according to claim 1, wherein the switch is positioned horizontally and generally in line with a center of the upper panel.

7. A device for controlling an electronic apparatus according to claim 1, wherein a dimensional ratio of each of the at least two arms, of a first distance, between the first end of the arm and the intermediate portion of the arm, by a second distance, between the intermediate portion of the arm and the second end of the arm, is identical for all the arms.

8. A device for controlling an electronic apparatus according to claim 1, wherein a plurality of counterweights are installed on the at least two arms, so as to compensate for a mass of the upper panel.

9. A device for controlling an electronic apparatus, comprising:
    a generally flat and horizontal upper panel on an upper face of the device, of which panel a control member is capable of exerting a control action, comprising a compressive force oriented generally downwards;
    a lower armature of a support, wherein the upper panel can move in a generally vertically downward movement under the effect of the control action with respect to the lower armature;
    a switch that is carried by the upper panel and can be actuated under the effect of the control action in order to produce a signal for controlling the electronic apparatus; and
    at least two arms for actuating the switch, each of the at least two arms comprising:
        a first end which bears vertically downwards on an upper of the lower armature,
        a second end which bears on the switch, and
        an intermediate portion which bears vertically upwards on a lower face of the upper panel and around which portion each of the at least two arms can pivot about a horizontal geometric pivot axis,
    in which the at least two arms cooperate with the upper panel and the lower armature in order to keep the upper panel parallel to a horizontal plane during its vertical movement with respect to the lower armature, and
    wherein the at least two arms bear on the switch via at least one lever articulated to a support about a horizontal axis, said support being stationary with respect to the upper panel.

10. A device for controlling an electronic apparatus according to claim 9, wherein the switch is interposed vertically between the second end of each of the at least two arms and at least one support that is stationary with respect to the upper panel.

11. A device for controlling an electronic apparatus according to claim 9, wherein a plurality of counterweights are installed on the at least one lever, so as to compensate for a mass of the upper panel.

12. A device for controlling an electronic apparatus according to claim 9, wherein the at least one lever has a first end on which the second end of each of the at least two arms bears and a second end which bears directly on the switch.

13. A device for controlling an electronic apparatus according to claim 12, wherein the switch is compressed vertically between the armature and a second end of the at least one lever.

14. A device for controlling an electronic apparatus according to claim 12, wherein the switch is compressed vertically between the upper panel and a second end of the at least one lever.

15. A device for controlling an electronic apparatus according to claim 9, wherein the first end of each of the at least two arms is positioned horizontally in line with a peripheral edge of the upper panel.

16. A device for controlling an electronic apparatus according to claim 9, wherein the switch is positioned horizontally and generally in line with a center of the upper panel.

17. A device for controlling an electronic apparatus according to claim 16, wherein the device comprises two arms placed horizontally and generally symmetrically with respect to the switch.

18. A device for controlling an electronic apparatus according to claim 9, wherein the device comprises two pairs of arms and two levers, each lever being associated with a pair of arms, in such a way that the second end of the arms of one pair of arms bears on a first end of the lever associated with the pair of arms and in such a way that the second end of each lever acts on the switch.

19. A device for controlling an electronic apparatus according to claim 9, wherein the dimensional ratio of each of the at least two arms, of a first distance, between the first end of the arm and the intermediate portion of the arm, by a second distance, between the intermediate portion of the arm and the second end of the arm, is identical for all the arms.

20. A device for controlling an electronic apparatus according to claim 9, wherein a plurality of counterweights are installed on the at least two arms, so as to compensate for a mass of the upper panel.

* * * * *